(12) United States Patent
Da Silva et al.

(10) Patent No.: US 11,808,321 B2
(45) Date of Patent: Nov. 7, 2023

(54) APPARATUS AND METHOD FOR CORRECTING AN IMBALANCE IN A SHAFT

(71) Applicant: Dana Automotive Systems Group, LLC, Maumee, OH (US)

(72) Inventors: Jose P. Da Silva, Maumee, OH (US); Jeffrey A. Dutkiewicz, Maumee, OH (US); Jeremy A. Rapp, Maumee, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 509 days.

(21) Appl. No.: 17/045,975

(22) PCT Filed: Apr. 9, 2019

(86) PCT No.: PCT/US2019/026461
§ 371 (c)(1),
(2) Date: Oct. 7, 2020

(87) PCT Pub. No.: WO2019/199728
PCT Pub. Date: Oct. 17, 2019

(65) Prior Publication Data
US 2021/0364060 A1    Nov. 25, 2021

Related U.S. Application Data

(60) Provisional application No. 62/654,744, filed on Apr. 9, 2018.

(51) Int. Cl.
*F16F 15/32* (2006.01)
*F16D 3/205* (2006.01)
*F16D 3/227* (2006.01)

(52) U.S. Cl.
CPC .......... *F16F 15/322* (2013.01); *F16D 3/2055* (2013.01); *F16D 3/227* (2013.01);
(Continued)

(58) Field of Classification Search
CPC ............ F16F 15/322; F16F 2230/0011; F16F 2232/02; F16D 3/2055; F16D 3/227; F16D 2300/22; Y10S 464/906
(Continued)

(56) References Cited

U.S. PATENT DOCUMENTS

| 4,223,565 A * | 9/1980 | Sugiyama | F16F 15/10 464/180 |
| 4,724,708 A * | 2/1988 | Okano | F16D 3/227 464/180 |

(Continued)

FOREIGN PATENT DOCUMENTS

WO    2015180780 A1    12/2015

OTHER PUBLICATIONS

ISA European Patent Office, International Search Report and Written Opinion Issued in Application No. PCT/US2019/026461, dated Jul. 9, 2019, WIPO, 14 pages.

*Primary Examiner* — Greg Binda
(74) *Attorney, Agent, or Firm* — McCoy Russell LLP

(57) ABSTRACT

An apparatus for correcting an imbalance in a rotating shaft along with a method for correcting the imbalance in a rotating shaft is identified. The apparatus includes a joint assembly having a first joint member that is drivingly connected to a second joint member by one or more third joint members. At least a portion of a first shaft may be drivingly connected to at least a portion of the first joint member and at least a portion of a second shaft may be drivingly connected to at least a portion of a second end portion of the second join member. A boot can may be connected to at least a portion of a first end portion of the second joint member. One or more balancing elements may then be connected to at least a portion of the boot can and/or the second joint member of the joint assembly.

19 Claims, 11 Drawing Sheets

(52) U.S. Cl.
CPC ... *F16D 2300/22* (2013.01); *F16F 2230/0011* (2013.01); *F16F 2232/02* (2013.01); *Y10S 464/906* (2013.01)

(58) Field of Classification Search
USPC .......................................................... 464/180
See application file for complete search history.

(56) References Cited

U.S. PATENT DOCUMENTS

| | | |
|---|---|---|
| 4,895,551 A | 1/1990 | Fritz |
| 5,628,688 A | 5/1997 | Eversole et al. |
| 9,670,964 B1 | 6/2017 | Burnard et al. |

\* cited by examiner

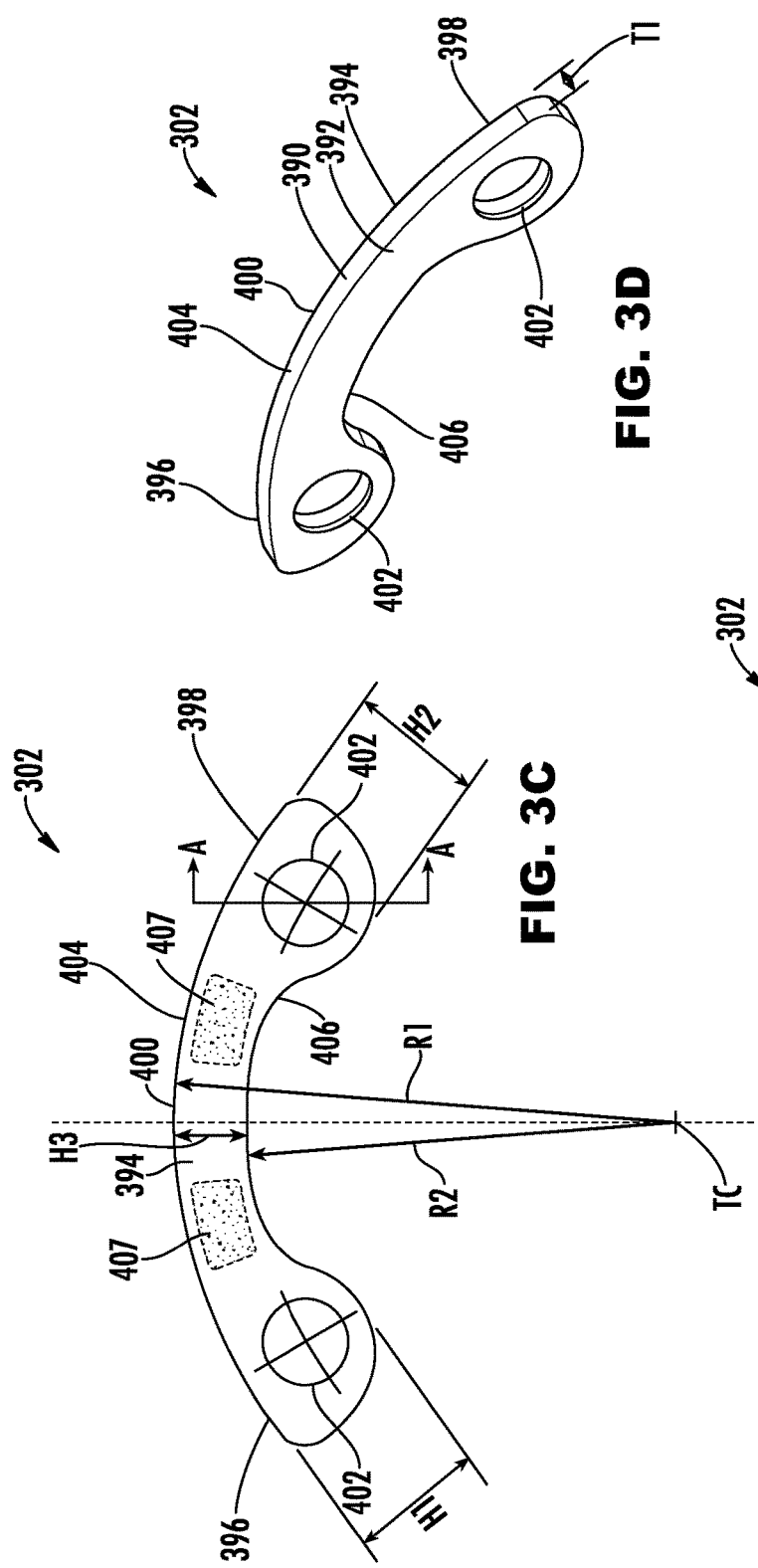
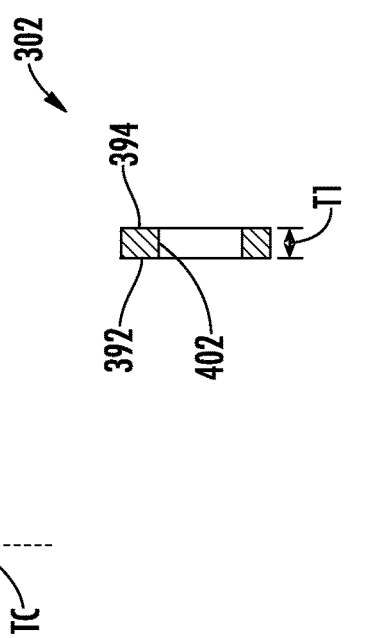
FIG. 3D
FIG. 3C
FIG. 3E
SECTION A-A

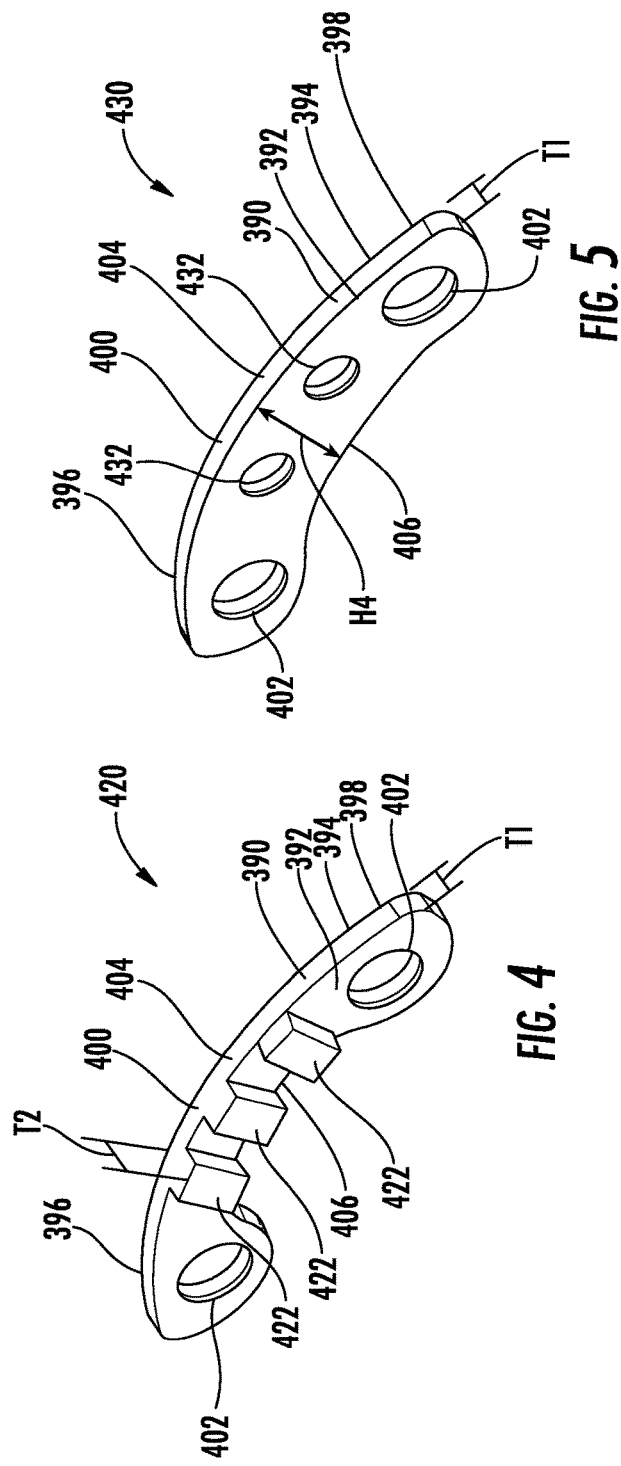
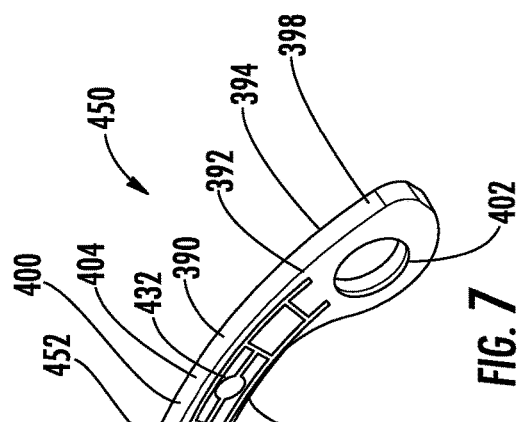
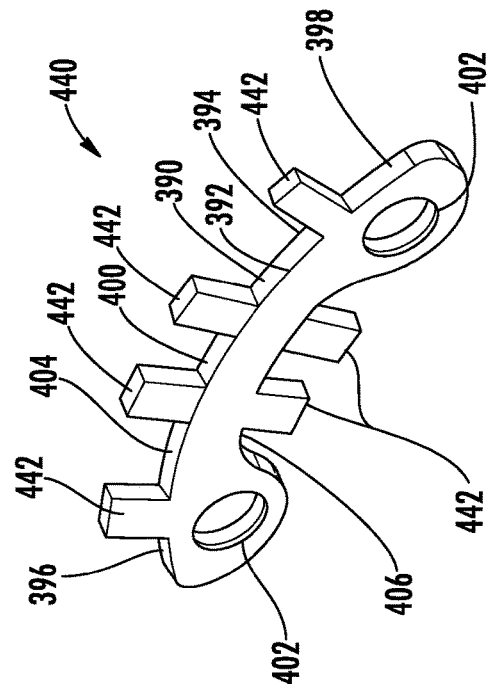
FIG. 4
FIG. 5
FIG. 6
FIG. 7

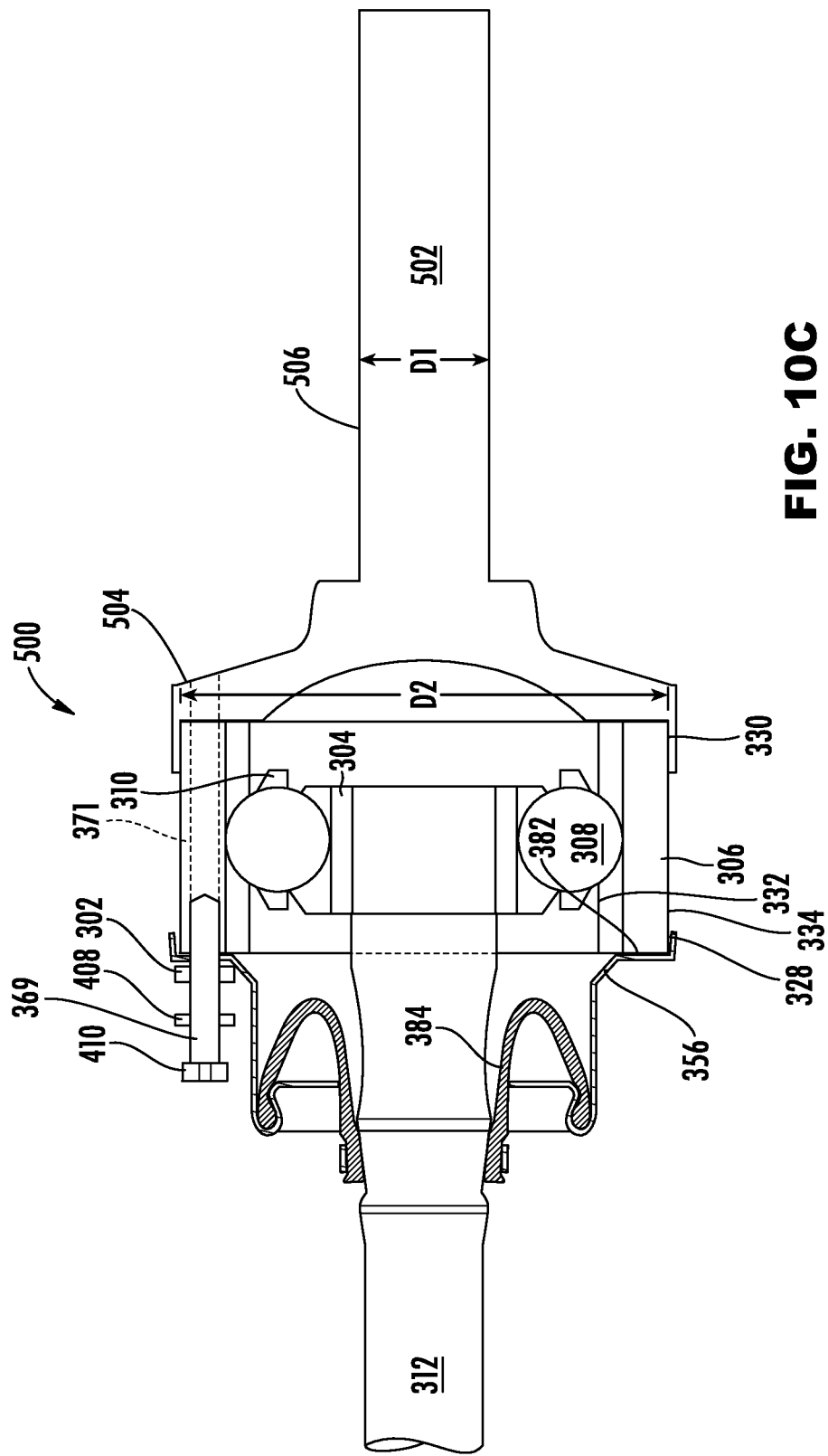

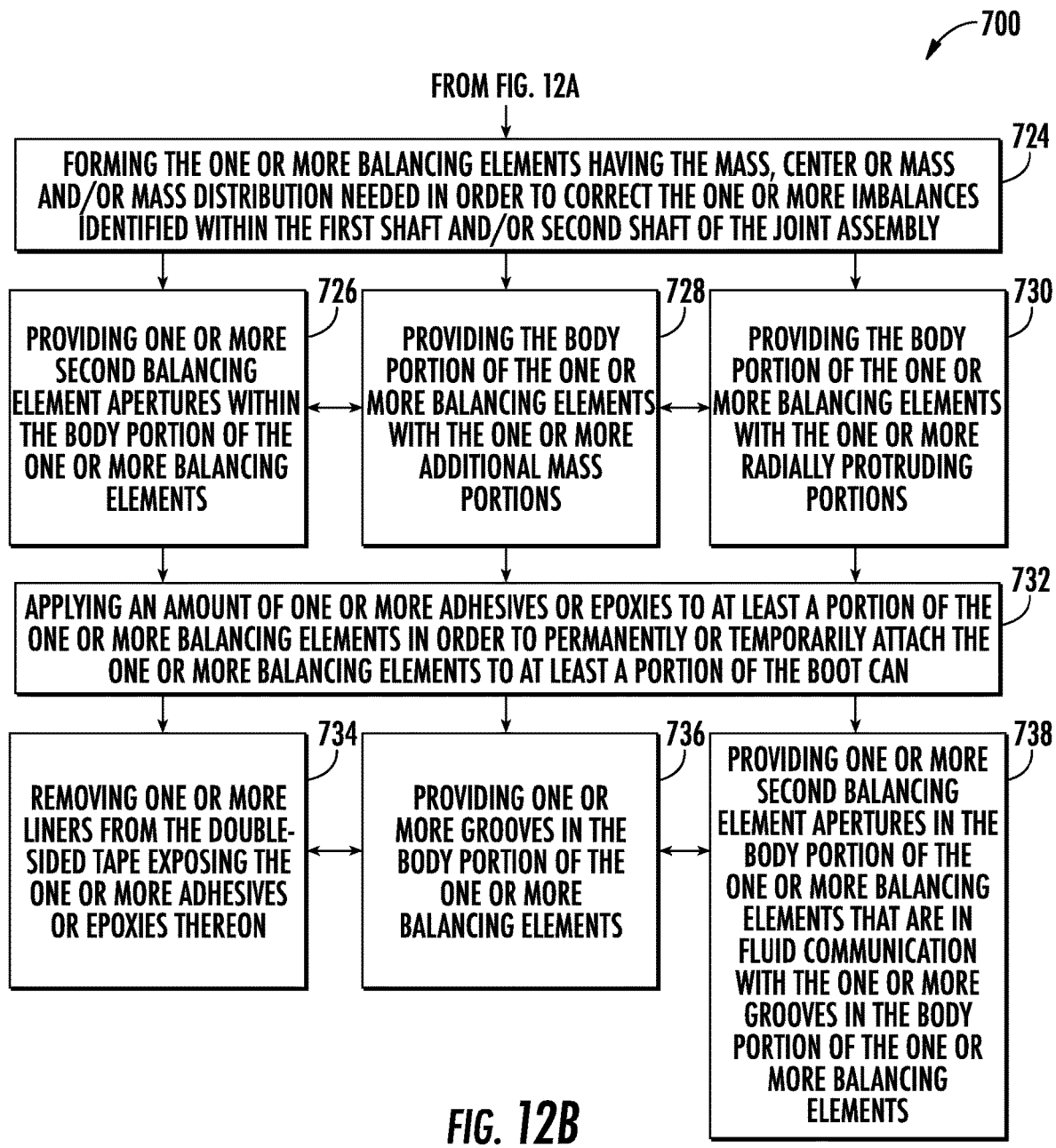

APPARATUS AND METHOD FOR CORRECTING AN IMBALANCE IN A SHAFT

CROSS-REFERENCE TO RELATED APPLICATIONS

The present application is a U.S. National Phase of International Application No. PCT/US2019/026461, entitled "APPARATUS AND METHOD FOR CORRECTING AN IMBALANCE IN A SHAFT", and filed on Apr. 9, 2019. International Application No. PCT/US2019/026461 claims priority to U.S. Provisional Patent Application No. 62/654,744, entitled "APPARATUS AND METHOD FOR CORRECTING AN IMBALANCE IN A SHAFT", and filed on Apr. 9, 2018. The entire contents of the above-listed applications are hereby incorporated by reference for all purposes.

TECHNICAL FIELD

The present disclosure related to an apparatus for correcting an imbalance in a rotating shaft along with a method for correcting the imbalance in the rotating shaft.

BACKGROUND

The conventional method of correcting an imbalance in a rotating shaft requires that attachment of one or more balancing elements to an outer surface of the shaft. This is done to reduce the amount of noise, vibration and/or harshness experienced by an operator and/or one or more passengers of a vehicle when in operation. Additionally, an imbalance in a rotating shaft has a detrimental effect on the overall life and durability of the shaft and any components connected to the shaft.

Typically, before the one or more balancing elements are attached to the outer surface of the shaft, an amount of material needs to be removed from the outer surface of the shaft in order to ensure a secure attachment of the one or more balancing elements to the shaft. As a result, this requires the use of additional machinery and manufacturing processes that increases the overall costs associates with the manufacture of the rotating shaft.

When correcting an imbalance in a rotating shaft, the radial distance from the center of the rotating shaft to the outermost surface of the balancing element is directly proportional to the amount of balancing element needed to correct the imbalance in the shaft. This can clearly be seen by referencing the below provided shaft balancing equation.

Imbalance=(Mass Balancing Element)×(Radius)

Typically, solid shafts are used when a hollow tubular shaft is unfeasible for use in that location. These solid shafts typically have a smaller outer diameter than a hollow tubular shaft. As a result, the size of the balancing element needed to correct an imbalance in a solid rotating shaft will be greater than the size of the balancing element needed to correct the same imbalance in a hollow tubular rotating shaft. This creates several issues when trying to balance a solid rotating shaft. In particular, the one or more balancing elements needed to correct an imbalance in a solid rotating shaft are bulky and therefore more expensive to manufacture.

Conventionally, the one or more balancing elements are attached to the outer surface of the shaft by using one or more welding processes which takes time and requires additional manufacturing equipment. Additionally, because the one or more balancing elements need to be thicker when balancing a solid shaft, manufactures' are unable to use conventional resistance welding techniques when attaching the one or more balancing elements to the outer surface of the shaft. This is due to the insufficient transmission of electricity through the thicker balancing element to the shaft. As a result, alternative welding processes need to be used which tend to weaken the shaft around the location of the balancing element due to the heat affected zone that is characteristic to those welding processes. This can result in a reduction in the overall life and durability of the shaft and the attachment process itself can create an imbalance in the shaft.

It would therefore be advantageous to develop a method and apparatus for correcting an imbalance in a rotating shaft, such as a solid shaft and/or a hollow tubular shaft, that is cost efficient, easy to perform and provides for easy attachment, removal and/or re-attachment of the balancing elements. Additionally, it would be advantageous to develop a method and apparatus for correcting an imbalance in a rotating shaft that aids in increasing the overall life and durability of the shaft.

SUMMARY

An apparatus for correcting an imbalance in a rotating shaft along with a method for correcting the imbalance in a rotating shaft identified. The apparatus includes a joint assembly having a first joint member that is drivingly connected to a second joint member by one or more third joint members. At least a portion of a first shaft may be drivingly connected to at least a portion of the first joint member and at least a portion of a second shaft may be drivingly connected to at least a portion of a second end portion of the second join member. A boot can may be connected to at least a portion of a first end portion of the second joint member of the joint assembly. One or more balancing elements may then be connected to at least a portion of the boot can and/or the second joint member of the joint assembly.

According to an aspect of the disclosure, the joint assembly may be a constant velocity joint assembly, a homokinetic joint, a CV joint, a plunging constant velocity joint, a direct pinion mount constant velocity joint, a plunging cross-groove sliding ball type constant velocity joint, a tripod type constant velocity joint or a fixed non-plunging type constant velocity joint.

According to any of the previous aspects of the disclosure, the first shaft and/or the second shaft may be solid, substantially solid or hollow.

According to any of the previous aspects of the disclosure, at least a portion of the second shaft may drivingly connected to the second end portion of the second joint member by using a companion flange having a first end portion, a second end portion, an inner surface and an outer surface. At least a portion of the first end portion of the companion flange may be drivingly connected to at least a portion of the second end portion of the second joint member and at least a portion of the second end portion of the companion flange may be drivingly connected to at least a portion of a first end portion of the second shaft.

According to any of the previous aspects of the disclosure, where the joint assembly further includes a flexible boot having a first end portion and a second end portion. At least a portion of the first end portion of the flexible boot may be sealingly engaged with at least a portion of an outer surface of the first shaft and at least a portion of a second end portion of the flexible boot may be sealingly engaged with at least a portion of a first end portion of the boot can. Additionally, at least a portion of a second end portion of the boot can may be connected to at least a portion of the first end portion of the second joint member.

According to any of the previous aspects of the disclosure, at least a portion of the second end portion of the boot can may have a radially outboard extending portion and at least a portion of the one or more balancing elements may be attached to at least a portion of the radially outboard extending portion of the boot can.

According to any of the previous aspects of the disclosure, one or more boot can apertures may extend from an inner surface to an outer surface of the radially outboard extending portion of the boot can. The one or more boot can apertures may be complementary to one or more second joint member apertures extending inboard from a first side of the second joint member. One or more first balancing element apertures may extend from a first side to a second side of a body portion of the one or more balancing elements. The one or more first balancing element apertures may be complementary to the one or more boot can apertures in the boot can and the one or more second joint member apertures in the second joint member. The one or more first balancing element apertures, the one or more boot can apertures and/or the one or more second joint member apertures may have a size and shape to receive and/or retain at least a portion of one or more mechanical fasteners.

According to any of the previous aspects of the disclosure, the body portion of the one or more balancing elements may have a thickness T1 that is substantially constant or variable from a first end portion to a second end portion of the body portion of the one or more balancing elements.

According to any of the previous aspects of the disclosure, the body portion of the one or more balancing elements may have a height that is substantially constant from the first end portion to the second end portion of the body portion.

According to any of the previous aspects of the disclosure, an intermediate portion of the body portion of the one or more balancing elements may have a height H3 that is less than a height H1 and H2 of the first end portion and the second end portion of the body portion of the one or more balancing elements.

According to any of the previous aspects of the disclosure, one or more adhesives or epoxies may be applied to at least a portion of the first side and/or the second side of the body portion of the one or more balancing elements. The one or more adhesives or epoxies may be used in order to adhere at least a portion of the one or more balancing elements to at least a portion of the outer surface of the radially outboard extending portion of the boot can.

According to any of the previous aspects of the disclosure, the one or more adhesives or epoxies applied to the second side of the body portion of the one or more balancing elements may be in the form of a double-sided tape.

According to any of the previous aspects of the disclosure, one or more grooves may extend along at least a portion of the first side and/or the second side of said body portion of the one or more balancing elements. The one or more grooves may have a size and shape to receive and/or retain at least a portion of the one or more adhesives or epoxies applied to the body portion of the one or more balancing elements.

According to any of the previous aspects of the disclosure, the body portion of the one or more balancing elements may have a radially outboard surface having a shape that is defined by a radius R1 from a theoretical center TC of the one or more balancing elements.

According to any of the previous aspects of the disclosure, the body portion of the one or more balancing elements may have a radially inboard surface having a shape that is defined by a radius R2 from a theoretical center TC of the one or more balancing elements.

According to any of the previous aspects of the disclosure, the body portion of the one or more balancing elements may further include one or more radially protruding portions extending outboard from at least a portion of the radially outboard surface of the body portion of the one or more balancing elements. The one or more radially protruding portions may be integrally formed as part of the body portion of the one or more balancing elements or may be integrally connected to at least a portion of the body portion of the one or more balancing elements.

According to any one of the previous aspects of the disclosure, at least a portion of one or more of the one or more radially protruding portions may extend at an angle away from the body portion of the one or more balancing elements.

According to any of the previous aspects of the disclosure, the joint assembly may further include one or more washers having a pre-determined mass. The one or more washers may be interposed between and may be in direct contact with at least a portion of a head of the one or more mechanical fasteners and/or the one or more balancing elements. Additionally, the one or more washers may aid in canceling out, reducing, minimizing and/or eliminating an imbalance within the first shaft and/or the second shaft.

According to any one of the previous aspects of the disclosure, the body portion of the one or more balancing elements may further include one or more additional mass portions extending from at least a portion of the first side and/or the second side of the body portion. At least a portion of the one or more additional mass portions may be integrally formed as part of the body portion of the one or more balancing elements or integrally connected to at least a portion of the body portion of the one or more balancing elements.

According to any one of the previous aspects of the disclosure, the one or more balancing elements may include one or more second balancing element apertures extending from the first side to the second side of the body portion of the one or more balancing elements. The one or more second balancing element apertures may be used in order to selectively alter a balancing element mass, a balancing element center of mass and/or a balancing element mass distribution of the one or more balancing elements.

According to any one of the previous aspects of the disclosure, the one or more second balancing element apertures may be in fluid communication with at least a portion of the one or more grooves in the body portion of the one or more balancing elements.

A method of balancing a shaft. The method includes providing a joint assembly having a first joint member drivingly connected to a second joint member by one or more third joint members, where a first shaft is drivingly connected to at least a portion of the first joint member, at least a portion of a second shaft may be drivingly connected to at least a portion of a second end portion of the second joint member, and at least a portion of a boot can having a radially outboard extending portion may be attached to at least a portion of a first end portion of the second joint member. Once the joint assembly has been provided, the joint assembly may be secured within a balancing assembly that rotates the joint assembly to identify an imbalance within the first shaft and/or the second shaft. Additionally, the balancing assembly may be designed in order to determine one or more balancing element locations, one or more balancing element masses, one or more balancing element center of masses and/or one or more balancing element mass distributions needed to cancel out, minimize and/or eliminate the imbalance identified within the first shaft and/or second shaft. One or more balancing elements having the one or more balancing element locations, the one or more balancing element masses, the one or more balancing element center of masses and/or the one or more balancing element mass distributions determined may then be attached to at least a portion of the radially outboard extending portion of the boot can in the one or more balancing element locations determined.

According to an aspect of the disclosure, one or more balancing elements may be attached to the radially outboard extending portion of the boot can by using one or more adhesives or epoxies or by using one or more mechanical fasteners.

According to any of the previous aspects of the disclosure, the method may further include the steps of rotating the joint assembly within the balancing assembly after attaching the one or more balancing elements to the boot can, identifying an imbalance within the first shaft and/or the second shaft, and attaching one or more additional balancing elements to the radially outboard extending portion of the boot can, or removing and re-attaching the one or more balancing elements to the radially outboard extending portion of the boot can in one or more new balancing element locations determined.

According to any one of the previous aspects of the disclosure, the method may further include the step of forming one or more balancing elements having the one or more balancing element masses, the one or more balancing element center of masses and/or the one or more balancing element mass distributions determined. The one or more balancing elements may be formed by providing the body portion with one or more second balancing element apertures, one or more radially protruding portions and/or one or more additional mass portions.

According to any one of the previous aspects of the disclosure, at least a portion of one or more of the one or more radially protruding portions may extend at an angle away from the body portion of the one or more balancing elements.

According to any one of the previous aspects of the disclosure, the method may further include the step of applying one or more adhesives or epoxies to at least a portion of the body portion of the one or more balancing elements in order to temporarily or permanently attach at least a portion of the one or more balancing elements to at least a portion of the boot can. The one or more adhesives or epoxies may be applied to the body portion of the one or more balancing elements within one or more grooves in the body portion of the one or more balancing elements, through one or more second balancing element apertures in the body portion of the one or more balancing elements, and/or as a double-sided tape.

BRIEF DESCRIPTION OF THE FIGURES

The above, as well as other advantages of the present disclosure, will become readily apparent to those skilled in the art from the following detailed description when considered in light of the accompanying drawings in which:

FIG. 3C is a schematic rear-view of the one or more balancing elements illustrated in FIGS. 3A and 3B according to an embodiment of the disclosure;

FIG. 3D is a schematic perspective view of the one or more balancing elements illustrated in FIGS. 3A-3C according to an embodiment of the disclosure;

FIG. 3E is a schematic cross-sectional view of the one or more balancing elements illustrated in FIGS. 3A-3D according to an embodiment of the disclosure along the line A-A;

FIG. 4 is a schematic perspective view of the one or more balancing elements illustrated in FIGS. 3A-3E according to an alternative embodiment of the disclosure;

FIG. 5 is a schematic perspective view of the one or more balancing elements illustrated in FIGS. 3A-4 of the disclosure according to another embodiment of the disclosure;

FIG. 6 is a schematic perspective view of the one or more balancing elements illustrated in FIGS. 3A-5 of the disclosure according to yet another embodiment of the disclosure;

FIG. 7 is a schematic perspective view of the one or more balancing elements illustrated in FIGS. 3A-6 of the disclosure according to still yet another embodiment of the disclosure;

FIG. 10C is a partial cut-away schematic side-view of the joint assembly illustrated in FIGS. 10A and 10B having one or more balancing elements according to an embodiment of the disclosure;

FIG. 12B is a flow-chart illustrating a portion of a method of correcting an imbalance in a rotating shaft using one or more balancing elements according to an embodiment of the disclosure.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the balancing method and apparatus disclosed herein may be used in automotive, off-road vehicle, all-terrain vehicle, construction, structural, marine, aerospace, locomotive, military, machinery, robotic and/or consumer product applications. Additionally, as a non-limiting example, the balancing method and apparatus disclosed herein may also be used in passenger vehicle, electric vehicle, hybrid vehicle, commercial vehicle, autonomous vehicles, semi-autonomous vehicles and/or heavy vehicle applications.

Figure 1:
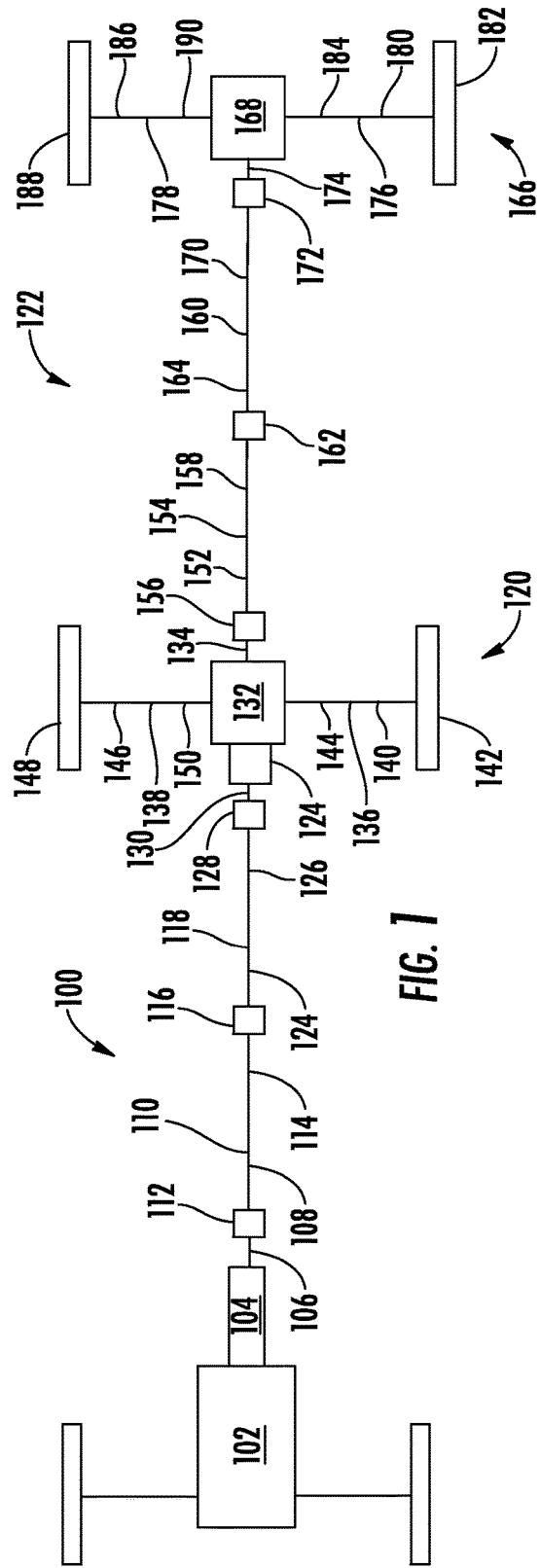
FIG. 1 is a schematic top-plan view of a vehicle having one or more rotating shafts that are balanced using one or more balancing elements according to an embodiment of the disclosure.

FIG. 1 is a schematic top-plan view of a vehicle 100 having one or more rotating shafts that are balanced according to an embodiment of the disclosure. The vehicle 100 has an engine 102 which is drivingly connected to a transmission 104. A transmission output shaft 106 is drivingly connected to an end of the transmission 104 opposite the engine 102. The transmission 104 is a power management system which provides controlled application of the rotational power generated by the engine by means of a gear box.

A first end portion 108 of a first propeller shaft 110 is drivingly connected to an end of the transmission output shaft 106 opposite the transmission 104 via a first coupling assembly 112. As a non-limiting example, the first coupling assembly 112 may be a homokinetic coupling assembly, a constant velocity joint assembly or a CV joint assembly. It is within the scope of this disclosure and as a non-limiting example that the first coupling assembly 112 may include one or balancing elements (not shown) in order to balance the first propeller shaft 110 and/or the transmission output shaft 106 of the vehicle 100.

As illustrated in FIG. 1 of the disclosure and as a non-limiting example, a second end portion 114 of the first propeller shaft 110 may be drivingly connected to a second coupling assembly 116. As a non-limiting example, the second coupling assembly 116 may be a homokinetic coupling assembly, a constant velocity joint assembly or a CV joint assembly.

Drivingly connected to an end of the second coupling assembly 116, opposite the first propeller shaft 110, is a second propeller shaft 118. The second propeller shaft 118 drivingly connects the transmission 104 to a forward tandem axle system 120 of a tandem axle system 122 having an inter-axle differential 124. As illustrated in FIG. 1 of the disclosure and as a non-limiting example, at least a portion of a first end portion 124 of the second propeller shaft 118 is drivingly connected to an end of the second coupling assembly 116 opposite the first propeller shaft 110. It is within the scope of this disclosure and as a non-limiting example that the second coupling assembly 116 may include one or balancing elements (not shown) in order to balance the first propeller shaft 110 and/or the second propeller shaft 118 of the vehicle 100.

At least a portion of a second end portion 126 of the second propeller shaft 118 is drivingly connected to an end of a third coupling assembly 128. As a non-limiting example, the third coupling assembly 128 is a universal joint assembly, a homokinetic coupling assembly, a constant velocity joint assembly or a CV joint assembly. It is within the scope of this disclosure and as a non-limiting example that the third coupling assembly 128 may include one or balancing elements (not shown) in order to balance the second propeller shaft 118 and/or a forward tandem axle system input shaft 130 of the vehicle 100.

Drivingly connected to an end of the third coupling assembly 128, opposite the second propeller shaft 118, is an end of the forward tandem axle system input shaft 130. An end of the forward tandem axle system input shaft 130, opposite the second propeller shaft 118, is drivingly connected to at least a portion of the inter-axle differential 124 of the forward tandem axle system 120. As a non-limiting example, the forward tandem axle system input shaft 130 may be an inter-axle differential input shaft, a coupling shaft, stub shaft or an inter-axle differential pinion shaft. The inter-axle differential 124 is a device that divides the rotational power generated by the engine 104 between the axles in a vehicle 100. The rotational power is transmitted through the forward tandem axle system 120 as described in more detail below.

As illustrated in FIG. 1 of the disclosure and as a non-limiting example, the inter-axle differential 124 is drivingly connected to a forward tandem axle differential 132 and a forward tandem axle system output shaft 134. The forward tandem axle differential 132 is a set of gears that allows the outer drive wheel(s) of a wheeled vehicle to rotate at a faster rate than the inner drive wheel(s).

The forward tandem axle system 120 further includes a first forward tandem axle half shaft 136 and a second front tandem axle half shaft 138. The first forward tandem axle half shaft 136 extends substantially perpendicular to the forward tandem axle system input shaft 130. At least a portion of a first end portion 140 of the first forward tandem axle half shaft 136 is drivingly connected to a first forward tandem axle wheel assembly 142 and at least a portion of a second end portion 144 of the first forward tandem axle half shaft 136 is drivingly connected to an end of the forward tandem axle differential 132. As a non-limiting example, the second end portion 144 of the first forward tandem axle half shaft 136 may be drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 130 is the second front tandem axle half shaft 138. At least a portion of a first end portion 146 of the second forward tandem axle half shaft 138 is drivingly connected to a second forward tandem axle wheel assembly 148. At least a portion of a second end portion 150 of the second forward tandem axle half shaft 138 is drivingly connected to an end of the forward tandem axle differential 132 opposite the first forward tandem axle half shaft 136. As a non-limiting example, the second end portion 150 of the second forward tandem axle half shaft 138 may be drivingly connected to a forward tandem axle differential side gear, a separate stub shaft, a separate coupling shaft, a second forward tandem axle differential output shaft and/or a shaft that is formed as part of a forward tandem axle differential side gear.

In accordance with an embodiment of the disclosure (not shown), the first end portion 140 and/or 146 of the first and/or second forward tandem axle half shaft 136 and/or 138 may include a joint assembly (not shown). It is within the scope of this disclosure and as a non-limiting example that the joint assembly (not shown) may include one or more balancing elements (not shown) in order to balance the first and/or second forward tandem axle half shaft 136 and/or 138 of the vehicle 100.

One end of the forward tandem axle system output shaft 134 is drivingly connected to a side of the inter-axle differential 124 opposite the second propeller shaft 118. An end of the forward tandem axle system output shaft 134, opposite the inter-axle differential 124, is drivingly connected to at least a portion of a first end portion 152 of a third propeller shaft 154 via a fourth coupling assembly 156. As a non-limiting example, the fourth coupling assembly 156 may be a homokinetic coupling assembly, a constant velocity joint assembly or a CV joint assembly. It is within the scope of this disclosure and as a non-limiting example that the fourth coupling assembly 156 may include one or balancing elements (not shown) in order to balance the third propeller shaft 154 and/or the forward tandem axle system output shaft 134 of the vehicle 100.

At least a portion of a second end portion 158 of the third propeller shaft 154 is drivingly connected to a fourth propeller shaft 160 via a fifth coupling assembly 162. As a non-limiting example, the fifth coupling assembly 162 may be a homokinetic coupling assembly, a constant velocity joint assembly or a CV joint assembly. It is within the scope of this disclosure and as a non-limiting example that the fifth coupling assembly 162 may include one or balancing elements (not shown) in order to balance the third propeller shaft 154 and/or the fourth propeller shaft 160 of the vehicle 100.

As illustrated in FIG. 1 of the disclosure and as a non-limiting example, at least a portion of a first end portion 164 of the fourth propeller shaft 160 may be drivingly connected to an end of the fifth coupling assembly 162 opposite the third propeller shaft 154. The fourth propeller shaft 160 drivingly connects the inter-axle differential 124 to a rear tandem axle system 166 having a rear tandem axle differential 168.

Additionally, as illustrated in FIG. 1 of the disclosure and as a non-limiting example, at least a portion of a second end portion 170 of the fourth propeller shaft 160 may be drivingly connected to an end of an sixth coupling assembly 172. As a non-limiting example, the sixth coupling assembly 172 may be a homokinetic coupling assembly, a constant velocity joint assembly or a CV joint assembly. It is within the scope of this disclosure and as a non-limiting example that the sixth coupling assembly 172 may include one or balancing elements (not shown) in order to balance the fourth propeller shaft 160 and/or a rear tandem axle system input shaft 174 of the vehicle 100.

Drivingly connected to an end of the sixth coupling assembly 172, opposite the fourth propeller shaft 160 is an end of the rear tandem axle system input shaft 174. As a non-limiting example, the rear tandem axle input shaft 174 may be a rear tandem axle differential input shaft, a coupling shaft, stub shaft or a rear tandem axle differential pinion shaft. Drivingly connected to an end of the rear tandem axle input shaft 174, opposite the fourth propeller shaft 160, is the rear tandem axle differential 168. The rear tandem axle differential 168 is a set of gears that allows the outer drive wheel(s) of the wheeled vehicle to rotate at a faster rate that the inner drive wheel(s). The rotational power is transmitted through the rear tandem axle system 166 as described in more detail below.

The rear tandem axle system 166 further includes a first rear tandem axle half shaft 176 and a second rear tandem axle half shaft 178. The first rear tandem axle half shaft 176 extends substantially perpendicular to the rear tandem axle system input shaft 174. At least a portion of a first end portion 180 of the first rear tandem axle half shaft 176 is drivingly connected to a first rear tandem axle wheel assembly 182 and at least a portion of a second end portion 184 of the first rear tandem axle half shaft 176 is drivingly connected to an end of the rear tandem axle differential 168. As a non-limiting example, the second end portion 184 of the first rear tandem axle half shaft 176 may be drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 174 is the second forward tandem axle half shaft 178. At least a portion of a first end portion 186 of the second rear tandem axle half shaft 178 is drivingly connected to a second rear tandem axle wheel assembly 188. Additionally, at least a portion of a second end portion 190 of the second rear tandem axle half shaft 178 is drivingly connected to an end of the rear tandem axle differential 168 opposite the first rear tandem axle half shaft 176. As a non-limiting example, the second end portion 190 of the second rear tandem axle half shaft 178 may be drivingly connected to a rear tandem axle differential side gear, a separate stub shaft, a separate coupling shaft, a second rear tandem axle differential output shaft and/or a shaft that is formed as part of a rear tandem axle differential side gear.

In accordance with an embodiment of the disclosure (not shown), the first end portion 180 and/or 186 of the first and/or second rear tandem axle half shaft 176 and/or 178 may include a joint assembly (not shown). It is within the scope of this disclosure and as a non-limiting example that the joint assembly (not shown) may include one or more balancing elements (not shown) in order to balance the first and/or second rear tandem axle half shaft 176 and/or 178 of the vehicle 100.

Figure 2:
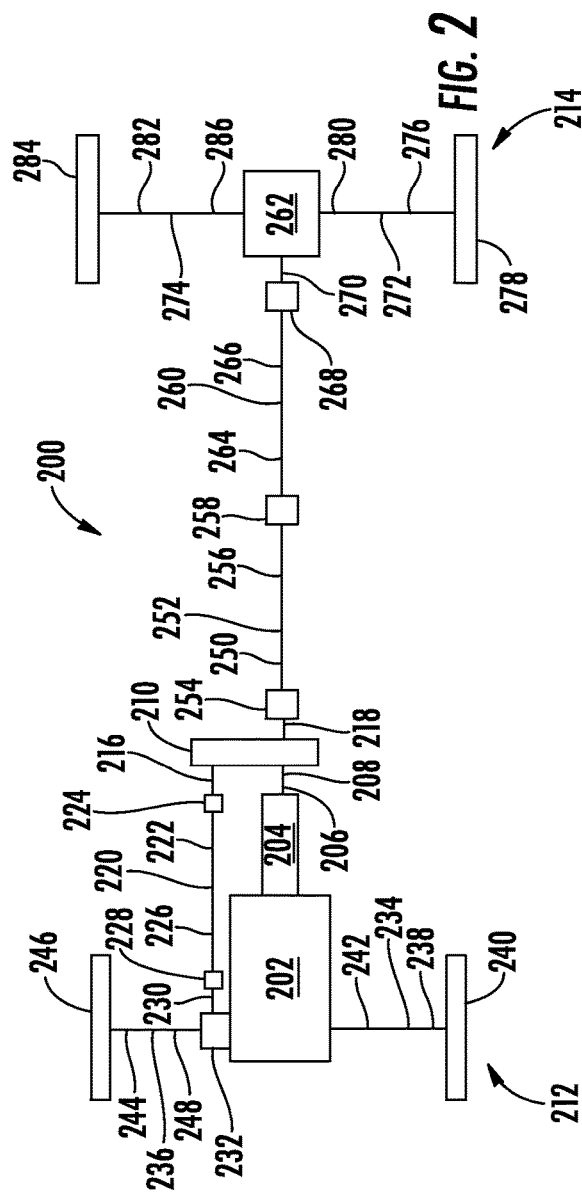
FIG. 2 is a schematic top-plan view of another vehicle having one or more rotating shafts that are balanced using one or more balancing elements according to an embodiment of the disclosure.

FIG. 2 is a schematic top-plan view of another vehicle 200 having one or more rotating shafts that are balanced according to an embodiment of the disclosure. The vehicle 200 has an engine 202 which is drivingly connected to a transmission 204. A transmission output shaft 206 is then drivingly connected to an end of the transmission 204 opposite the engine 202. The transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a rear axle system 214 by utilizing a series of gears and drive shafts. The transfer case 210 further includes a first transfer case output 216 shaft and a second transfer case output shaft 218.

A first propeller shaft 220 extends from the first transfer case output shaft 216 toward the front axle system 212 of the vehicle 200. At least a portion of a first end portion 222 of the first propeller shaft 220 is drivingly connected to an end of the first transfer case output shaft 216 opposite the transfer case 210 via a first coupling assembly 224. As a non-limiting example, the first coupling assembly 224 may be a homokinetic coupling assembly, a constant velocity joint assembly or a CV joint assembly. It is within the scope of this disclosure and as a non-limiting example that the first coupling assembly 224 may include one or balancing elements (not shown) in order to balance the first propeller shaft 220 and/or the first transfer case output shaft 216 of the vehicle 200.

As illustrated in FIG. 2 of the disclosure and as a non-limiting example, at least a portion of a second end portion 226 of the first propeller shaft 220 is drivingly connected to a second coupling assembly 228. As a non-limiting example, the second coupling assembly 228 may be a homokinetic coupling assembly, a constant velocity joint assembly or a CV joint assembly. It is within the scope of this disclosure and as a non-limiting example that the second coupling assembly 228 may include one or balancing elements (not shown) in order to balance the first propeller shaft 220 and/or a front axle system input shaft 230 of the vehicle 200.

Drivingly connected to an end of the second coupling assembly 228, opposite the first propeller shaft 220, is an end of the front axle system input shaft 230. As a non-limiting example, the front axle system input shaft 230 may be a front axle differential input shaft, a coupling shaft, stub shaft or a front axle differential pinion shaft. Drivingly connected to an end of the front axle system input shaft 230, opposite the first propeller shaft 220, is a front axle differential 232. The front axle differential 232 is a set of gears that allows the outer drive wheel(s) of the wheeled vehicle to rotate at a faster rate that the inner drive wheel(s). The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. At least a portion of a first end portion 238 of the first front axle half shaft 234 is drivingly connected to a first front axle wheel assembly 240 and at least a portion of a second end portion 242 of the first front axle half shaft 234 is drivingly connected to an end of the front axle differential 232. As a non-limiting example, the second end portion 242 of the first front axle half shaft 234 may be drivingly connected to a front axle differential side gear, a separate stub shaft, a separate coupling shaft, a first front axle differential output shaft and/or a shaft that is formed as part of a front axle differential side gear.

Extending substantially perpendicular to the front axle system input shaft 230 is the second front axle half shaft 236. At least a portion of a first end portion 244 of the second front axle half shaft 236 is drivingly connected to a second front axle wheel assembly 246. Additionally, at least a portion of a second end portion 248 of the second front axle half shaft 236 is drivingly connected to an end of the front axle differential 232 opposite the first front axle half shaft 234. As a non-limiting example, the second end portion 248 of the second front axle half shaft 236 may be drivingly connected to a front axle differential side gear, a separate stub shaft, a separate coupling shaft, a second front axle differential output shaft and/or a shaft that is formed as part of a front axle differential side gear.

In accordance with an embodiment of the disclosure (not shown), the first end portion 238 and/or 244 of the first and/or second front axle half shaft 234 and/or 236 may include a joint assembly (not shown). It is within the scope of this disclosure and as a non-limiting example that the joint assembly (not shown) may include one or more balancing elements (not shown) in order to balance the first and/or second forward tandem axle half shaft 234 and/or 236 of the vehicle 200.

An end of the second transfer case output shaft 218 is drivingly connected to an end of the transfer case 210 opposite the transfer case input shaft 208. As illustrated in FIG. 2 of the disclosure and as a non-limiting example, at least a portion of a first end portion 250 of a second propeller shaft 252 is drivingly connected to an end of the second transfer case output shaft 218 opposite the transfer case 210 via a third coupling assembly 254. As non-limiting example, the third coupling assembly 254 may be a homokinetic coupling assembly, a constant velocity joint assembly or a CV joint assembly. It is within the scope of this disclosure and as a non-limiting example that the third coupling assembly 254 may include one or balancing elements (not shown) in order to balance the second propeller shaft 252 and/or the second transfer case output shaft 218 of the vehicle 200.

As best seen in FIG. 2 of the disclosure and as a non-limiting example, at least a portion of a second end portion 256 of the second propeller shaft 252 is drivingly connected to a fourth coupling assembly 258. As a non-limiting example, the fourth coupling assembly 258 may be a homokinetic coupling assembly, a constant velocity joint assembly or a CV joint assembly.

Drivingly connected to an end of the fourth coupling assembly 258, opposite the second propeller shaft 252, is a third propeller shaft 260. The third propeller shaft 260 drivingly connects the transfer case 210 to a rear differential 262 of the rear axle system 214. As illustrated in FIG. 2 of the disclosure and as a non-limiting example, at least a portion of a first end portion 264 of the third propeller shaft 260 is drivingly connected to an end of the fourth coupling assembly 258 opposite the second propeller shaft 252. It is within the scope of this disclosure and as a non-limiting example that the fourth coupling assembly 258 may include one or balancing elements (not shown) in order to balance the second propeller shaft 252 and/or the third propeller shaft 260 of the vehicle 200.

At least a portion of a second end portion 266 of the third propeller shaft 260 is drivingly connected to an end of a fifth coupling assembly 268. As a non-limiting example, the fifth coupling assembly 268 may be a homokinetic coupling assembly, a constant velocity joint assembly or a CV joint assembly. It is within the scope of this disclosure and as a non-limiting example that the fifth coupling assembly 268 may include one or balancing elements (not shown) in order to balance the third propeller shaft 260 and/or a rear axle system input shaft 270 of the vehicle 200.

Drivingly connected to an end of the fifth coupling assembly 268, opposite the third propeller shaft 260, is an end of the rear axle system input shaft 270. An end of the rear axle system input shaft 270, opposite the third propeller shaft 260, is drivingly connected to the rear differential 262 of the rear axle system 214. As a non-limiting example, the rear axle system input shaft 270 may be a rear differential input shaft, a coupling shaft, stub shaft or a rear axle differential pinion shaft. The rear axle differential 262 is a set of gears that allows the outer drive wheel(s) of the wheeled vehicle to rotate at a faster rate that the inner drive wheel(s). The rotational power is transmitted through the rear axle system 214 as described in more detail below.

The rear axle system 214 further includes a first rear axle half shaft 272 and a second rear axle half shaft 274. The first rear axle half shaft 272 extends substantially perpendicular to the rear axle system input shaft 270. At least a portion of a first end portion 276 of the first rear axle half shaft 272 is drivingly connected to a first rear axle wheel assembly 278 and at least a portion of a second end portion 280 of the first rear axle half shaft 272 is drivingly connected to an end of the rear axle differential 262. As a non-limiting example, the second end portion 280 of the first rear axle half shaft 272 may be drivingly connected to a rear axle differential side gear, a separate stub shaft, a separate coupling shaft, a first rear axle differential output shaft and/or a shaft that is formed as part of a rear axle differential side gear.

Extending substantially perpendicular to the rear axle system input shaft 270 is the second rear axle half shaft 274. At least a portion of a first end portion 282 of the second rear axle half shaft 274 is drivingly connected to a second rear axle wheel assembly 284. Additionally, at least a portion of a second end portion 286 of the second rear axle half shaft 274 is drivingly connected to an end of the rear axle differential 262 opposite the first rear axle half shaft 272. As a non-limiting example, the second end portion 286 of the second rear axle half shaft 274 may be drivingly connected to a rear axle differential side gear, a separate stub shaft, a separate coupling shaft, a second rear axle differential output shaft and/or a shaft that is formed as part of a rear axle differential side gear.

In accordance with an embodiment of the disclosure (not shown), the first end portion 276 and/or 282 of the first and/or second rear axle half shaft 272 and/or 274 may include a joint assembly (not shown). It is within the scope of this disclosure and as a non-limiting example that the joint assembly (not shown) may include one or more balancing elements (not shown) in order to balance the first and/or second forward tandem axle half shaft 272 and/or 274 of the vehicle 200.

Figure 3A:
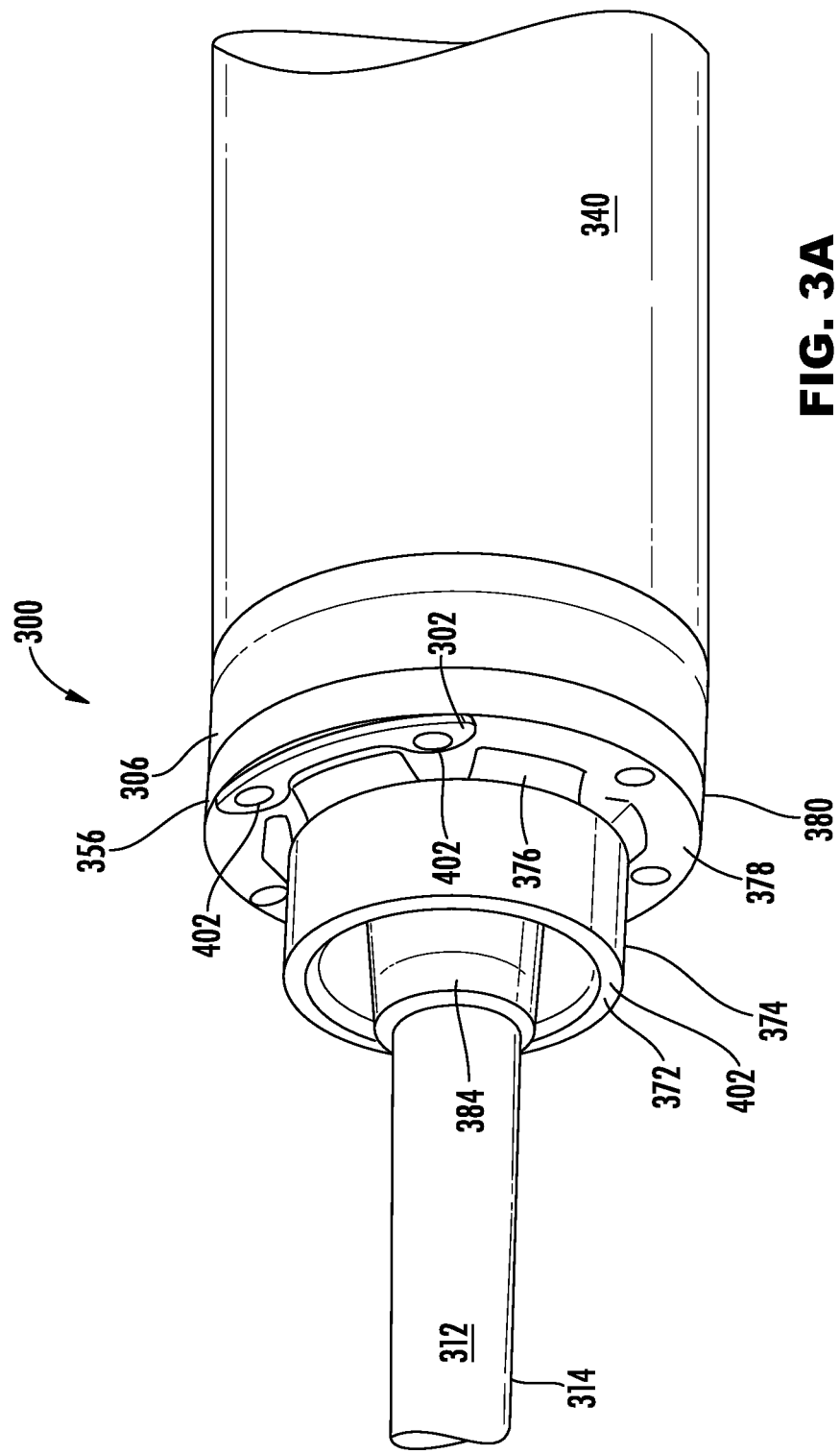
FIG. 3A is a schematic perspective view of a joint assembly having one or more balancing elements according to an embodiment of the disclosure.
Figure 3B:
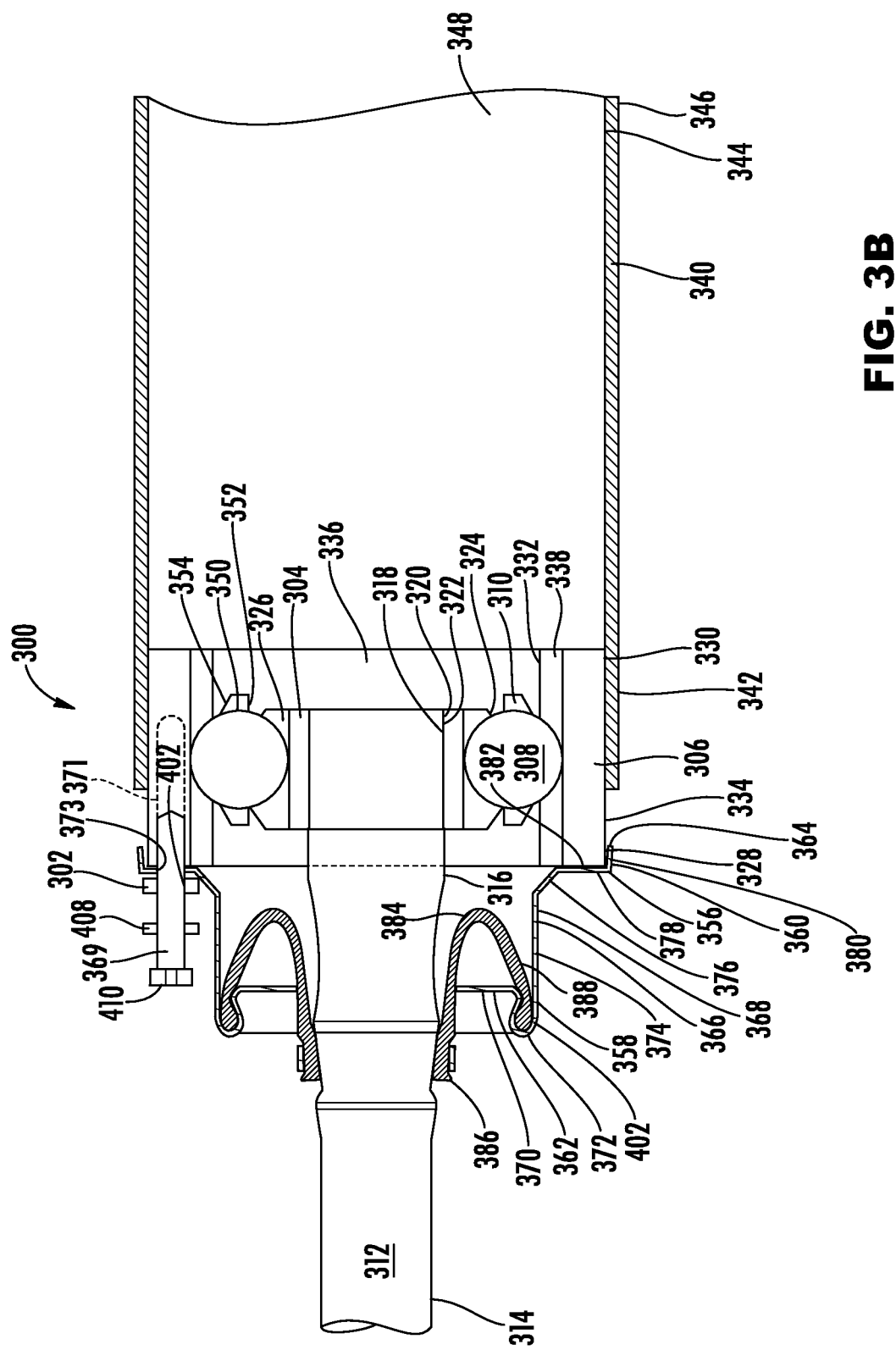
FIG. 3B is a partial cut-away schematic side-view of the joint assembly illustrated in FIG. 3A having one or more balancing elements according to an embodiment of the disclosure.

FIGS. 3A-3E provide a schematic illustration of a joint assembly 300 having one or more balancing elements 302 according to an embodiment of the disclosure. As best seen in FIG. 3B of the disclosure and as a non-limiting example, the joint assembly 300 has a first joint member 304 that is drivingly connected to at least a portion of a second joint member 306 via one or more third joint members 308 retained within a third joint member 310. It is within the scope of this disclosure and as a non-limiting example that the joint assembly 300 may be a constant velocity joint assembly, a homokinetic joint, a CV joint, a plunging constant velocity joint, a direct pinion mount constant velocity joint, a plunging cross-groove sliding ball type constant velocity joint, a tripod type constant velocity joint or a fixed non-plunging type constant velocity joint.

At least a portion of a first shaft 312 having an outer surface 314, a first end portion (not shown) and a second end portion 316 may be drivingly connected to at least a portion of the first joint member 304. A plurality of axially extending first shaft splines 318 may circumferentially extending from at least a portion of the outer surface 314 of the second end portion 316 of the first shaft 312. The plurality of axially extending first shaft splines 318 may be complementary to and meshingly engaged with a plurality of axially extending first joint member splines 320 circumferentially extending from at least a portion of an inner surface 322 of the first joint member 304. It is within the scope of this disclosure and as a non-limiting example that the first shaft may be a substantially solid shaft. It is within the scope of this disclosure and as a non-limiting example that the first shaft may be a stub shaft, an intermediate shaft, a drive sleeve, a prop shaft, a propeller shaft, a drive shaft, a pinion shaft, an axle half shaft, an input shaft or an output shaft. As a result, it is to be understood that the first shaft 310 may be a driving shaft that provides an amount of rotational energy to the joint assembly 300 or a driven shaft that transmits the rotational energy from the joint assembly 300 to an adjacent drive-train component (not shown). Additionally, it is within the scope of this disclosure and as a non-limiting example that the first joint member 304 may be integrally formed as part of the first shaft 312 or connected to at least a portion of the first joint member 304 as a separate component.

One or more first joint member grooves 326 may circumferentially extending along at least a portion of an outer surface 324 of the first joint member 304. The one or more first joint member grooves 326 may be of a size and shape to receive and/or retain at least a portion of the one or more third joint members 308 of the joint assembly 300. It is within the scope of this disclosure and as a non-limiting example that the first joint member 304 may be an inner race.

At least a portion of the second joint member 306 may be disposed radially outboard from at least a portion of the first joint member 304 of the joint assembly 300. As best seen in FIG. 3B of the disclosure and as a non-limiting example, the second joint member 306 has a first end portion 328, a second end portion 330, an inner surface 332 and an outer surface 334. The inner surface 332 and the outer surface 334 of the second joint member 306 defines a hollow portion 336 therein having a size and shape to receive and/or retain at least a portion the first joint member 304, the one or more third joint members 308 and the third joint member 310 of the joint assembly 300. It is within the scope of this disclosure and as a non-limiting example that the second joint member 306 may be an outer race.

Circumferentially extending from at least a portion of the inner surface 332 of the second joint member 306 is one or more second joint member grooves 338. The one or more second joint member grooves 338 have a size and shape to receive and/or retain at least a portion of the one or more third joint members 308 of the joint assembly 300.

A second shaft 340 having a first end portion 342, a second end portion (not shown), an inner surface 344 and an outer surface 346 may be drivingly connected to at least a portion of the second end portion 330 of the second joint member 306. The inner surface 344 and the outer surface 346 of the second shaft 340 defines a hollow portion 348 therein. It is within the scope of this disclosure and as a non-limiting example that at least a portion of the first end portion 342 of the second shaft 340 may be drivingly connected to at least a portion of the second end portion 330 of the second joint member 306 by using one or more welds, one or more mechanical fasteners, one or more adhesives, a splined connection and/or a threaded connection. Additionally, it is within the scope of this disclosure and as a non-limiting example that the second shaft 340 may be a stub shaft, an intermediate shaft, a drive sleeve, a prop shaft, a propeller shaft, a drive shaft, a pinion shaft, an axle half shaft, an input shaft or an output shaft. As a result, it is therefore to be understood that the second shaft 340 may be a driving shaft that provides an amount of rotational energy to the joint assembly 300 or a driven shaft that transmits the rotational energy from the joint assembly 300 to an adjacent drive-train component (not shown).

According to an embodiment of the disclosure (not shown) and as a non-limiting example, at least a portion of the first end portion 342 of the second shaft 340 may be drivingly connected to the second joint member 306 via a companion flange (not shown) and/or a stub shaft (not shown). In accordance with this embodiment of the disclosure (not shown) and as a non-limiting example, at least a portion of a first end portion of the companion flange (not shown) and/or stub shaft (not shown) may be drivingly connected to at least a portion of the second end portion 330 of the second joint member 306 by using one or more welds, one or more mechanical fasteners, one or more adhesives, a spline connection and/or a threaded connection. At least a portion of a second end portion of the companion flange (not shown) and/or stub shaft (not shown) may be drivingly connected to at least a portion of the first end portion 342 of the second shaft 340 of the joint assembly 300. It is within the scope of this disclosure and as a non-limiting example that the first end portion 342 of the second shaft 340 may be drivingly connected to at least a portion of the second end portion of the companion flange (not shown) and/or stub shaft (not shown) by using one or more welds, one or more mechanical fasteners, one or more adhesives, a spline connection and/or a threaded connection.

In accordance with the embodiment of the disclosure illustrated in FIG. 3B and as a non-limiting example, at least a portion of the third joint member 310 may be interposed between the first joint member 304 and the second joint member 306 of the joint assembly 300. The third joint member 310 has one or more openings 350 extending from an inner surface 352 to an outer surface 354 of the third joint member 310. The one or more openings 350 in the third joint member 310 are of a size and shape to receive and/or retain at least a portion of one or more of the one or more third joint members 308 of the joint assembly 300. It is within the scope of this disclosure and as a non-limiting example that the third joint member 310 may be a cage.

At least a portion of a boot can 356 having a first end portion 358, a second end portion 360, a first end 362, a second end 364, an inner surface 366 and an outer surface 368 may be disposed radially outboard from at least a portion of the first shaft 312 of the joint assembly 300. As best seen in FIG. 3B and as a non-limiting example, at least a portion of the second end portion 360 of the boot can 356 may be integrally connected to at least a portion of the first end portion 328 of the second joint member 306 of the joint assembly 300. In accordance with the embodiment of the disclosure illustrated in FIG. 3B of the disclosure and as a non-limiting example, at least a portion of the second end portion 360 of the boot can 356 may be connected to at least a portion of the first end portion 328 of the second joint member 306 by using one or more mechanical fasteners 369. As a result, it is therefore to be understood that the one or more mechanical fasteners 368 of the joint assembly 300 may be received and/or retained within one or more second joint member attachment apertures 371 extending inboard from a first side 382 of the second joint member 306.

In accordance with the embodiment of the disclosure illustrated in FIG. 3B and as a non-limiting example, the boot can 356 may include, from the first end 362 to the second end 364 of the boot can 356, a radially inward extending annular lip portion 370, a substantially hook-shaped portion 372, a substantially cylindrical or substantially conical portion 374, an increasing diameter portion 376, a radially outboard extending portion 378 and/or a substantially cylindrical attachment portion 380. It is within the scope of this disclosure and as a non-limiting example that the substantially cylindrical or substantially conical portion 474 may be substantially parallel to the substantially cylindrical attachment portion 380 of the boot can 356. Additionally, it is within the scope of this disclosure and as a non-limiting example that the radially outboard extending portion 378 may be substantially disc-shaped and may extend substantially perpendicular to the substantially cylindrical or substantially conical portion 474 and/or the substantially cylindrical attachment portion 380 of the boot can 356.

As best seen in FIGS. 3A and 3B of the disclosure and as a non-limiting example, when the joint assembly 300 is assembled, at least a portion of the substantially cylindrical attachment portion 380 may be in direct contact with at least a portion of the outer surface 334 of the first end portion 328 of the second joint member 306. Additionally, according to the embodiment of the disclosure illustrated in FIGS. 3A and 3B and as a non-limiting example, when the joint assembly 300 is assembled, at least a portion of the radially outboard extending portion 378 may be in direct contact with at least a portion of the first side 382 of the second joint member 306. It is within the scope of this disclosure and as a non-limiting example that the boot can 356 of the joint assembly 300 may take on other shapes and/or geometries in order to accommodate the one or more balancing elements 302 to correct an imbalance in the first shaft 312 and/or the second shaft 340.

In order to attach the boot can 356 to the second joint member 306, the one or more mechanical fasteners 369 are received and/or retained within at least a portion of one or more boot can apertures 373 extending from the inner surface 366 to the outer surface 368 of the radially outboard extending portion 378 of the boot can 356. It is therefore to be understood that the one or more boot can apertures 373 are complementary to the one or more second joint member attachment apertures 371 in the second joint member 306 of the joint assembly 300.

At least a portion of a flexible boot member 384 having a first end portion 386 and a second end portion 388 may be disposed radially outboard from at least a portion of the first shaft 312 of the joint assembly 300. At least a portion of the first end portion 386 of the flexible boot member 384 may be sealingly engaged with at least a portion of the outer surface 314 of the first shaft 312 and at least a portion of the second end portion 386 may be sealingly engaged with at least a portion of the first end portion 358 of the boot can 356. It is to be understood that the flexible boot member 384 aids in preventing the migration of dirt, debris and/or moisture into the joint assembly 300 and aids in ensuring that the lubricant fluid (not shown) is retained within the joint assembly 300. As a result, the flexible boot member 384 allows the first shaft 312, the first joint member 304, the third joint member 310 and/or the one or more third joint members 308 to articulate relative to the second joint member 306 while still providing a sealing engagement between the boot can 356 and the first shaft 312.

According to the embodiment of the disclosure illustrated in FIGS. 3A and 3B and as a non-limiting example, at least a portion of the second end portion 386 of the flexibly boot member 384 may be received and/or retained within at least a portion of the substantially hook-shaped portion 372 of the first end portion 358 of the boot can 356. It is within the scope of this disclosure and as a non-limiting example that the substantially hook-shaped portion 372 of the boot can 356 may elastically deform to receive and/or retain the second end portion 386 of the flexible boot member 384. Additionally, it is within the scope of this disclosure and as a non-limiting example that the substantially hook-shaped portion 372 may be plastically deformed, or crimped, in order to receive and/or retain at least a portion of the second end portion 386 of the flexible boot member 384.

As best seen in FIGS. 3A and 3B of the disclosure and as a non-limiting example, at least a portion of the one or more balancing elements 302 are secured and/or attached to at least a portion of the second end portion 360 of the boot can 356 of the joint assembly 300. By attaching one or more of the one or more balancing elements 302 to the boot can 356, the one or more balancing elements 302 may correct an imbalance in the first shaft 312 and/or the second shaft 340 when in operation. It is within the scope of this disclosure and as a non-limiting example that the one or more balancing elements 302 may be made using one or more stamping processes, one or more sintering processes, one or more casting processes, one or more injection molding processes, one or more machining processes, one or more forging processes, one or more additive manufacturing processes and/or by using one or more metal forming processes. Additionally, it is within the scope of this disclosure and as a non-limiting example that at least a portion of the one or more balancing elements 302 may be made of an aluminium alloy, a low carbon steel alloy, a sintered metal alloy, a polymeric composition and/or an engineered plastic composition.

As best seen in FIGS. 3A and 3C-3E of the disclosure and as a non-limiting example, the one or more balancing elements 302 have a body portion 390 having a first side 392, a second side 394, a first end portion 396, a second end portion 398 and an intermediate portion 400 interposed between the first and second end portions 396 and 398 of the one or more balancing elements 302. When the joint assembly 300 is assembled, at least a portion of the second side 394 of the one or more balancing elements 302 are disposed axially outboard from and directly adjacent to the radially outboard extending portion 378 of the boot can 356. As a result, it is therefore to be understood that at least a portion of the second side 394 of the one or more balancing elements 302 may be in direct contact with and/or attached to at least a portion of the outer surface 368 of the radially outboard extending portion 378 of the boot can 356.

One or more first balancing element apertures 402 may extend from the first side 392 to the second side 394 of the one or more balancing elements 302. The one or more first balancing element apertures 402 may be aligned with and complementary to at least a portion of the one or more boot can apertures 373 in the boot can 356 and/or at least a portion of the one or more one or more second joint member attachment apertures 371 in the second joint member 306. Additionally, the one or more first balancing element apertures 402 may have a size and shape needed in order to receive and/or retain at least a portion of one or more of the one or more mechanical fasteners 369 of the joint assembly 300. In accordance with the embodiment illustrated in FIGS. 3A, 3C and 3D and as a non-limiting example, one or more of the one or more first balancing element apertures 402 may be located in the first end portion 396 and/or the second end portion 398 of the body portion 390 of the one or more balancing elements 302. It is within the scope of this disclosure and as a non-limiting example that the one or more balancing elements 302 may be attached and/or retained to the boot can 356 and the second joint member 306 of the joint assembly 300 by using one or more welds, one or more adhesives, a threaded connection, a press-fit connection, an interference connection, a staking connection and/or by using the one or more of the mechanical fasteners 369 used to attach the boot can 356 to the second joint member 306.

As best seen in FIGS. 3D and 3E of the disclosure and as a non-limiting example, the body portion 390 of the one or more balancing elements 302 has a thickness T1. According to an embodiment of the disclosure and as a non-limiting example, the thickness T1 may be substantially constant across the body portion 390 of the one or more balancing elements 302. It is to be understood that as the thickness T1 of the one or more balancing elements 302 changes, the overall mass of the one or more balancing elements 302 changes. As the thickness T1 of the body portion 390 decreases the overall mass of the one or more balancing elements 302 decreases. Similarly, as the thickness T1 of the body portion 390 increases the overall mass of the one or more balancing elements 302 increases. It is therefore to be understood that the thickness T1 of the one or more balancing elements 302 may be precisely engineered, customized and/or calibrated in order to achieve the mass needed to cancel out, reduce, minimize and/or eliminate the imbalance(s) identified within the first shaft 312 and/or the second shaft 340.

In accordance with the embodiment of the disclosure illustrated in FIG. 3C and as a non-limiting example, the body portion 390 of the one or more balancing elements 302 may have a variable height that changes from the first end portion 396 to the second end portion 398 of the one or more balancing elements 302. As best seen in FIG. 3C and as a non-limiting example, the height H1 of the first end portion 396 may be substantially equal to a height H2 of the second end portion 398 of the body portion 390 of the one or more balancing elements 302. Additionally, as illustrated in FIG. 3C of the disclosure and as a non-limiting example, the intermediate portion 400 of the body portion 390 of the one or more balancing elements 302 may have a height H3 that is less than the heights H1 and H2 of the one or more balancing elements 302. It is within the scope of this disclosure and as a non-limiting example that the height H3 of the intermediate portion 400 of the body portion 390 of the one or more balancing elements 302 may be substantially constant or variable. By altering the height H3 of the intermediate portion 400 of the body portion 390 of the one or more balancing elements 302, the overall mass of the one or more balancing elements 302, the center of mass of the one or more balancing elements 302 and/or the mass distribution of the one or more balancing elements 302 may be changed as needed. As a result, this allows the one or more balancing elements 302 to be precisely engineered, customized and/or calibrated in order to achieve the mass needed to cancel out, reduce, minimize and/or eliminate the imbalance(s) identified within the first shaft 312 and/or the second shaft 340.

As best seen in FIGS. 3C and 3D and as a non-limiting example, the body portion 390 of the one or more balancing elements 302 may have a radially outboard surface 404 and a radially inboard surface 406. It is within the scope of this disclosure and as a non-limiting example, that the radially outboard surface 404 and/or the radially inboard surface 406 of the body portion 390 of the one or more balancing elements 302 may have a substantially arcuate shape. According to the embodiment of the disclosure illustrated in FIG. 3C and as a non-limiting example, the radially outboard surface 404 may have a shape defined by a radius R1 from a theoretical center TC of the one or more balancing elements 302. Additionally, according to the embodiment of the disclosure illustrated in FIG. 3C and as a non-limiting example, the radially inboard surface 406 may have a shape defined by a radius R2 from the theoretical center TC of the one or more balancing elements 302.

At least a portion of the second side 394 of the body portion 390 of the one or more balancing elements 302 may include an amount of one or more adhesives or epoxies 407 in one or more locations. The one or more adhesives or epoxies 407 aid in permanently and/or temporarily attaching at least a portion of the one or more balancing elements 302 to the outer surface 368 of the radially outboard extending portion 378 of the boot can 356. By applying an amount of the one or more adhesives or epoxies 407 to the second side 394 of the body portion 390, the one or more balancing elements 302 may be temporarily attached to the boot can 356 thereby allowing the one or more balancing elements 302 to be removed and re-attached as needed. This provides a quick and easy way to check and ensure that the correct balancing element has been used and attached in its optimal position along the boot can 356 to cancel out, reduce, minimize and/or eliminate the imbalance(s) identified within the first shaft 312 and/or the second shaft 340. It is within the scope of this disclosure and as a non-limiting example that the one or more adhesives or epoxies 407 may coat either all of part of the second side 394 of the body portion 390 of the one or more balancing elements 302. Additionally, it is within the scope of this disclosure and as a non-limiting example that the one or more adhesives or epoxies 407 may be applied to the second side 394 of the body portion 390 by using a double-sided tape, a roller and/or a brush.

As best seen in FIG. 3B of the disclosure and as a non-limiting example, the joint assembly 300 may further include the use of one or more washers 408. When assembled, at least a portion of the one or more washers 408 are interposed between and are in direct contact with at least a portion of a head 410 of the one or more mechanical fasteners 369 and the one or more balancing elements 302. It is within the scope of this disclosure and as a non-limiting example the one or more washers 408 may have a per-determined mass needed to aid in canceling out, reducing, minimizing and/or eliminating the imbalance(s) identified within the first shaft 312 and/or the second shaft 340.

FIG. 4 is a schematic perspective view of one or more balancing elements 420 according to an alternative embodiment of the disclosure. The one or more balancing elements 420 illustrated in FIG. 4 are the same as the one or more balancing elements 302 illustrated in FIGS. 3A-3E, except where specifically noted below. As illustrated in FIG. 4 of the disclosure and as a non-limiting example, the body portion 390 of the one or more balancing elements 420 may have a variable thickness.

In accordance with the embodiment illustrated in FIG. 4 of the disclosure and as a non-limiting example, the body portion 390 of the one or more balancing elements 420 may include one or more additional mass portions 422 having a thickness T2. The one or more additional mass portions 422 may be used in order to selectively alter the overall mass of the one or more balancing elements 420, the center of mass of the one or more balancing elements 420 and/or the mass distribution of the one or more balancing elements 420 as needed. As illustrated in FIG. 4 and as a non-limiting example, the one or more additional mass portions 422 may extend outward from at least a portion of the first side 392 and/or the second side 394 of the body portion 390 of the one or more balancing elements 420. It is within the scope of this disclosure and as a non-limiting example that the one or more additional mass portions 422 may extend from the radially outboard surface 404 to the radially inboard surface 406 of the body portion 390 of the one or more balancing elements 420, may extend from the radially outboard and/or inboard surface 404 and/or 406 to any point between the radially outboard and inboard surfaces 404 and 406, and/or may be disposed between the radially outboard surface 404 and the radially inboard surface 406 of the body portion 390. This may aid in providing the clearance needed in order to securely attach at least a portion of the one or more balancing elements 420 and/or the boot can 356 to at least a portion of the joint assembly 300.

It is within the scope of this disclosure and as a non-limiting example, that the one or additional mass portions 422 may be integrally formed as part of the body portion 390 of the one or more balancing elements 420 or integrally connected to at least a portion of the body portion 390 of the one or more balancing elements 420 as a separate component. According to the embodiment where the one or more additional mass portions 422 are integrally formed as part of the body portion 390 of the one or more balancing elements 420, the one or more additional mass portions 422 may be created by removing an amount of material from the body portion 390. In accordance with the embodiment where the one or more additional mas elements 422 are separate components, at least a portion of the one or more additional mass elements 422 may be connected to at least a portion of the body portion 390 by using one or more welds, one or more mechanical fasteners, one or more adhesives, a threaded connection, a press-fit connection, an interference fit connection and/or a staking connection. As a non-limiting example, the thickness T2 may be greater than or less than the thickness T1 of the body portion 390 of the one or more balancing elements 420.

In light of the foregoing, it is therefore to be understood that by providing one or more balancing elements 420 having a body portion 390 with a variable thickness, it allows the overall mass, the center of mass and/or the mass distribution of the one or more balancing elements 420 to be customized for any particular application. For example, if the balancing mass and/or balancing element location determined to cancel out, reduce, minimize and/or eliminate the imbalance(s) identified within the first shaft 312 and/or the second shaft 340 is at or near the one or more first balancing element apertures 402, then the thickness T2 may be increased by the one or more additional mass elements 422 in that region and/or the thickness T1 outside that region of the body portion 390 may be reduced. This allows for on the fly addition and/or removal of material to and/or from the body portion 390 of the one or more balancing elements 420 in order to achieve the overall mass, center of mass and/or mass distribution needed to cancel out, reduce, minimize and/or eliminate the imbalance(s) identified within the first shaft 312 and/or the second shaft 340. As a result, it is therefore to be understood that the one or more balancing elements 420 may be precisely engineered, customized and/or calibrated in order to achieve the mass needed to cancel out, reduce, minimize and/or eliminate the imbalance(s) identified within the first shaft 312 and/or the second shaft 340.

FIG. 5 is a schematic perspective view of one or more balancing elements 430 according to another embodiment of the disclosure. The one or more balancing elements 430 illustrated in FIG. 5 are the same as the one or more balancing elements 302 and 420 illustrated in FIGS. 3A-4, except where specifically noted below. As illustrated in FIG. 5 of the disclosure and as a non-limiting example, the body portion 390 of the one or more balancing elements 430 may have a height H4 that is substantially uniform or substantially constant across the length of the one or more balancing elements 430. It is to be understood that as the height H4 of the body portion 390 of the one or more balancing elements 430 increases, the overall mass of the of the one or more balancing elements 430 increases and as the height H4 of the body portion 390 decreases, the overall mass of the of the one or more balancing elements 430 decreases. In light of the foregoing, it is therefore to be understood that the height H4 and the thickness of the body portion 390 of the one or more balancing elements 430 may be optimized in order to achieve the mass needed to cancel out, reduce, minimize and/or eliminate the imbalance(s) identified within the first shaft 312 and/or the second shaft 340.

In accordance with the embodiment illustrated in FIG. 5 of the disclosure and as a non-limiting example, the one or more balancing elements 430 may further include one or more second balancing element apertures 432 extending from a first side 392 to a second side 394 of the body portion 390 of the one or more balancing elements 430. The one or more second balancing element apertures 432 may be used in order to selectively alter the overall mass of the one or more balancing elements 430, the center of mass of the one or more balancing elements 430 and/or the mass distribution of the one or more balancing elements 430 as needed. This allows for on the fly addition and/or removal of material to and/or from the body portion 390 of the one or more balancing elements 430 in order to achieve the overall mass, center of mass and/or mass distribution needed to cancel out, reduce, minimize and/or eliminate the imbalance(s) identified within the first shaft 312 and/or the second shaft 340. As a result, it is therefore to be understood that the one or more balancing elements 430 may be precisely engineered, customized and/or calibrated in order to achieve the mass needed to cancel out, reduce, minimize and/or eliminate the imbalance(s) identified within the first shaft 312 and/or the second shaft 340. It is within the scope of this disclosure and as a non-limiting example that the one or more second balancing element apertures 432 may be machined out of the body portion 390 of the one or more balancing elements 430, punched out of the body portion 309 of the one or more balancing elements 430, and/or drilled out of the body portion 390 of the one or more balancing elements 430.

FIG. 6 is a schematic perspective view of one or more balancing elements 440 according to yet another embodiment of the disclosure. The one or more balancing elements 440 illustrated in FIG. 6 are the same as the one or more balancing elements 302, 420 and 430 illustrated in FIGS. 3A-5, except where specifically noted below. As illustrated in FIG. 6 of the disclosure and as a non-limiting example, the body portion 390 of the one or more balancing elements 440 may include one or more radially protruding portions 442.

In accordance with the embodiment illustrated in FIG. 6 of the disclosure and as a non-limiting example, the one or more radially protruding portions 442 may extend outward from at least a portion of the radially outboard surface 404 and/or the radially inboard surface 406 of the body portion 390 of the one or more balancing elements 440. The one or more radially protruding portions 442 may be used in order to change the overall mass of the one or more balancing elements, the center of mass of the one or more balancing elements and/or the mass distribution of the one or more balancing elements 440. It is within the scope of this disclosure and as a non-limiting example that the one or more radially protruding portions 442 of the one or more balancing elements 440 may be integrally formed as part of the body portion 390 or integrally connected to at least a portion of the body portion 390 of the one or more balancing elements 440 as a separate component. In accordance with the embodiment where the one or more radially protruding portions 442 are integrally formed as part of the body portion 390 of the one or more balancing elements 440, the one or more radially protruding portions 442 may be moulded, cast, stamped or machined in order to form a single unitary the body portion 390. According to the embodiment where the one or more balancing elements 442 are separate components from the body portion 390 of the one or more balancing elements 442, at least a portion of the one or more radially protruding portions 442 may be connected to at least a portion of the body portion 390 by using one or more welds, one or more adhesives, one or more mechanical fasteners, a threaded connection, a press-fit connection, an interference fit connection and/or a staking connection. As a result, it is therefore to be understood that the one or more radially protruding portions 442 aid in allowing the one or more balancing elements 440 to be precisely engineered, customized and/or calibrated in order to achieve the mass needed to cancel out, reduce, minimize and/or eliminate the imbalance(s) identified within the first shaft 312 and/or the second shaft 340.

FIG. 7 is a schematic perspective view of one or more balancing elements 450 according to yet another embodiment of the disclosure. The one or more balancing elements 450 illustrated in FIG. 7 are the same as the one or more balancing elements 302, 420, 430 and 440 illustrated in FIGS. 3A-6, except where specifically noted below. As illustrated in FIG. 7 of the disclosure and as a non-limiting example, the body portion 390 of the one or more balancing elements 450 may include one or more grooves 452.

According to the embodiment illustrated in FIG. 7 of the disclosure and as a non-limiting example, the body portion 390 of the one or more balancing elements 450 may include one or more grooves 452 extending along at least a portion of the first side 392 and/or the second side 394 of the one or more balancing elements 450. The one or more grooves 452 in the body portion 390 of the one or more balancing elements 450 may be of a size and shape needed to receive and/or retain at least a portion of the one or more adhesives or epoxies 407. This may aid in providing a secure connection between the one or more balancing elements 450 and the boot can 356 and/or may aid in providing a secure connection between the one balancing elements 450 and the one or more washers 408. It is within the scope of this disclosure and as a non-limiting example that one or more of the one or more grooves 452 in the body portion 390 of the one or more balancing elements 450 may be or may not be in fluid communication with each other. Additionally, it is within the scope of this disclosure and as a non-limiting example that the one or more grooves 452 may have any shape and/or orientation needed in order to ensure that the one or more adhesives or epoxies 407 have a shear strength that is sufficient to withstand the centrifugal and dynamic forces acting upon the one or more balancing elements 450 when in operation.

As illustrated in FIG. 7 of the disclosure and as a non-limiting example, the one or more balancing elements 450 may include the one or more second balancing element apertures 432 extending from the first side 392 to the second side 394 of the body portion 390 of the one or more balancing elements 450. It is within the scope of this disclosure and as a non-limiting example that at least a portion of the one or more second balancing element apertures 432 may be in fluid communication with at least a portion of the one or more grooves 452 in the body portion 390 of the one or more balancing elements 450. In light of the foregoing, it is therefore to be understood that the one or more second balancing element apertures 432 may aid in providing access to the one or more grooves 452 in the one or more balancing elements 450. This allows an amount of the one or more adhesives or epoxies 407 to be deposited within the one or more grooves 452 through the one or more second balancing element apertures 432. As a result, the one or more second balancing element apertures 432 may aid in securing at least a portion of the one or more balancing elements 450 to at least a portion of the boot can 356 and/or at least a portion of the one or more washers 408.

Figure 8:
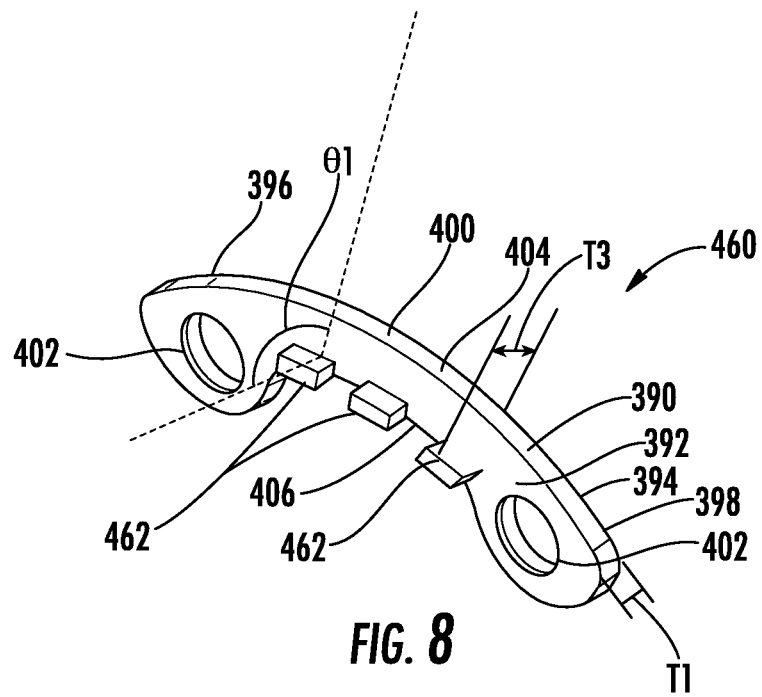
FIG. 8 is a schematic perspective view of the one or more balancing elements illustrated in FIGS. 3A-7 of the disclosure according to still yet another embodiment of the disclosure.

FIG. 8 is a schematic perspective view of one or more balancing elements 460 according to still yet another embodiment of the disclosure. The one or more balancing elements 460 illustrated in FIG. 8 are the same as the one or more balancing elements 302, 420, 430, 440 and 450 illustrated in FIGS. 3A-7, except where specifically noted below. As illustrated in FIG. 8 of the disclosure and as a non-limiting example, the body portion 390 of the one or more balancing elements 460 may have a variable thickness.

In accordance with the embodiment illustrated in FIG. 8 of the disclosure and as a non-limiting example, the body portion of the one or more balance ng elements 460 may include one or more additional mass portions 462 having a thickness T3. The one or more additional mass portions 462 may be used in order to selectively alter the overall mass of the one or more balancing elements 460, the center of mass of the one or more balancing elements 460 and/or the mass distribution of the one or more balancing elements 460 as needed. As illustrated in FIG. 8 and as a non-limiting example, the one or more additional mass portions 462 may extend outward from at least a portion of the first side 392 and/or the second side 394 of the body portion 390 of the one or more balancing elements 460. It is within the scope of this disclosure and as a non-limiting example that the one or more additional mass portions 462 may extend from the radially outboard surface 404 to the radially inboard surface 406 of the body portion 390 of the one or more balancing elements 460, may extend from the radially outboard and/or inboard surface 404 and/or 406 to any point between the radially outboard and inboard surfaces 404 and 406, and/or may be disposed between the radially outboard surface 404 and the radially inboard surface 406 of the body portion 390. This may aid in providing the clearance needed in order to securely attach at least a portion of the one or more balancing elements 460 and/or the boot can 356 to at least a portion of the joint assembly 300.

It is within the scope of this disclosure and as a non-limiting example, that the one or additional mass portions 462 may be integrally formed as part of the body portion 390 of the one or more balancing elements 460 or integrally connected to at least a portion of the body portion 390 of the one or more balancing elements 460 as a separate component. According to the embodiment where the one or more additional mass portions 462 are integrally formed as part of the body portion 390 of the one or more balancing elements 460, the one or more additional mass portions 462 may be created by removing an amount of material from the body portion 390. In accordance with the embodiment where the one or more additional mas elements 462 are separate components, at least a portion of the one or more additional mass elements 462 may be connected to at least a portion of the body portion 390 by using one or more welds, one or more mechanical fasteners, one or more adhesives, a threaded connection, a press-fit connection, an interference fit connection and/or a staking connection. As a non-limiting example, the thickness T3 may be greater than or less than the thickness T1 of the body portion 390 of the one or more balancing elements 460.

At least a portion of one or more of the one or more additional mass portions 462 may extend from the body portion 390 of the one or more balancing elements 460 at an angle $\theta1$ from the body portion 390 of the one or more balancing elements 460. By altering the angle $\theta1$, the center of mass of the one or more balancing elements 460 and/or the mass distribution of the one or more balancing elements 460 may be altered as needed. Additionally, by providing one or more of the one or more additional mass portions 462 that extend at the angle $\theta0$ or by allowing at least a portion of the one or more additional mass portions 462 to extend at the angle $\theta1$, it aids in providing the clearance needed to securely attach the boot can 356 and/or the one or more balancing elements 460 to the joint assembly 300. It is within the scope of this disclosure and as a non-limiting example that the angle $\theta1$ may be from approximately 5° to approximately 180°.

In light of the foregoing, it is therefore to be understood that by providing one or more balancing elements 460 having a body portion 390 with a variable thickness, it allows the overall mass, the center of mass and/or the mass distribution of the one or more balancing elements 460 to be customized for any particular application. For example, if the balancing mass and/or balancing element location determined to cancel out, reduce, minimize and/or eliminate the imbalance(s) identified within the first shaft 312 and/or the second shaft 340 is at or near the one or more first balancing element apertures 402, then the thickness T3 may be increased by the one or more additional mass elements 462 in that region and/or the thickness Ti outside that region of the body portion 390 may be reduced. This allows for on the fly addition and/or removal of material to and/or from the body portion 390 of the one or more balancing elements 460 in order to achieve the overall mass, center of mass and/or mass distribution needed to cancel out, reduce, minimize and/or eliminate the imbalance(s) identified within the first shaft 312 and/or the second shaft 340. As a result, it is therefore to be understood that the one or more balancing elements 460 may be precisely engineered, customized and/or calibrated in order to achieve the mass needed to cancel out, reduce, minimize and/or eliminate the imbalance(s) identified within the first shaft 312 and/or the second shaft 340.

Figure 9:
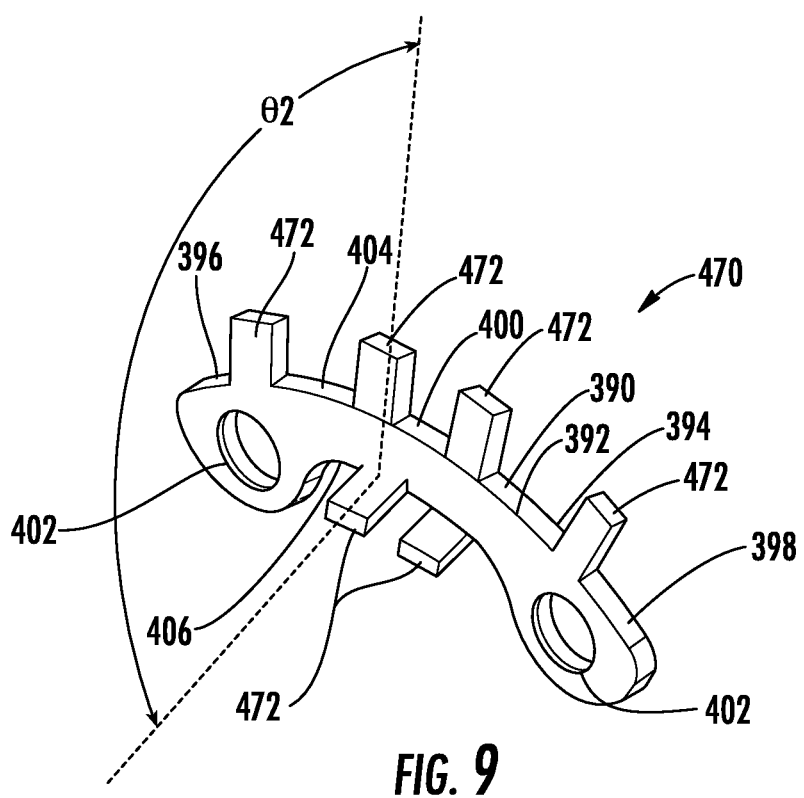
FIG. 9 is a schematic perspective view of the one or more balancing elements illustrated in FIGS. 3A-8 of the disclosure according to still yet another embodiment of the disclosure.

FIG. 9 is a schematic perspective view of one or more balancing elements 470 according to still yet another embodiment of the disclosure. The one or more balancing elements 470 illustrated in FIG. 9 is the same as the one or m roe balancing elements 302, 420, 430, 440, 450 and 460 illustrated in FIGS. 3A-8, except where specifically noted below. As illustrated in FIG. 9 of the disclosure and as a non-limiting example, the body portion 390 of the one or more balancing elements 470 may include one or more radially protruding portions 472.

In accordance with the embodiment illustrated in FIG. 9 of the disclosure and as a non-limiting example, the one or more radially protruding portions 472 may extend outward from at least a portion of the radially outboard surface 404 and/or the radially inboard surface 406 of the body portion 390 of the one or more balancing elements 470. The one or more radially protruding portions 472 may be used in order to change the overall mass of the one or more balancing elements, the center of mass of the one or more balancing elements and/or the mass distribution of the one or more balancing elements 470.

As illustrated in FIG. 9 of the disclosure and as a non-limiting example, at least a portion of one or more of the one or more radially protruding portions 472 may extend at an angle θ2 from the body portion 390 of the one or more balancing elements 470. By altering the angle θ2, the center of mass of the one or more balancing elements 470 and/or the mass distribution of the one or more balancing elements 470 may be altered as needed. Additionally, by providing one or more of the one or more additional mass portions 472 that extend at the angle θ2 or by allowing at least a portion of the one or more additional mass portions 472 to extend at the angle θ2, it aids in providing the clearance needed to securely attach the boot can 356 and/or the one or more balancing elements 470 to the joint assembly 300. As a non-limiting example, the angle θ2 may be from approximately 5° to approximately 180°.

It is within the scope of this disclosure and as a non-limiting example that the one or more radially protruding portions 472 of the one or more balancing elements 470 may be integrally formed as part of the body portion 390 or integrally connected to at least a portion of the body portion 390 of the one or more balancing elements 470 as a separate component. In accordance with the embodiment where the one or more radially protruding portions 472 are integrally formed as part of the body portion 390 of the one or more balancing elements 470, the one or more radially protruding portions 472 may be moulded, cast, stamped or machined in order to form a single unitary the body portion 390. According to the embodiment where the one or more balancing elements 472 are separate components from the body portion 390 of the one or more balancing elements 472, at least a portion of the one or more radially protruding portions 472 may be connected to at least a portion of the body portion 390 by using one or more welds, one or more adhesives, one or more mechanical fasteners, a threaded connection, a press-fit connection, an interference fit connection and/or a staking connection. As a result, it is therefore to be understood that the one or more radially protruding portions 472 aid in allowing the one or more balancing elements 470 to be precisely engineered, customized and/or calibrated in order to achieve the mass needed to cancel out, reduce, minimize and/or eliminate the imbalance(s) identified within the first shaft 312 and/or the second shaft 340.

Figure 10A:
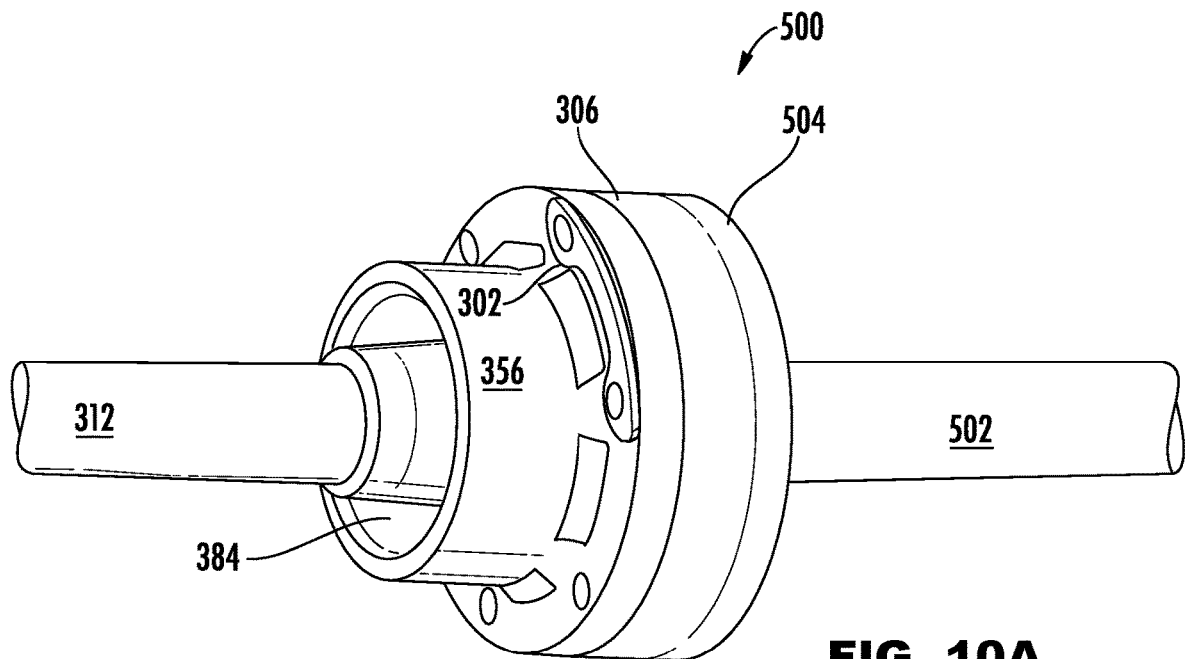
FIG. 10A is a schematic perspective view of another joint assembly having one or more balancing elements according to an embodiment illustrated in FIGS. 3A-9 of the disclosure.
Figure 10B:
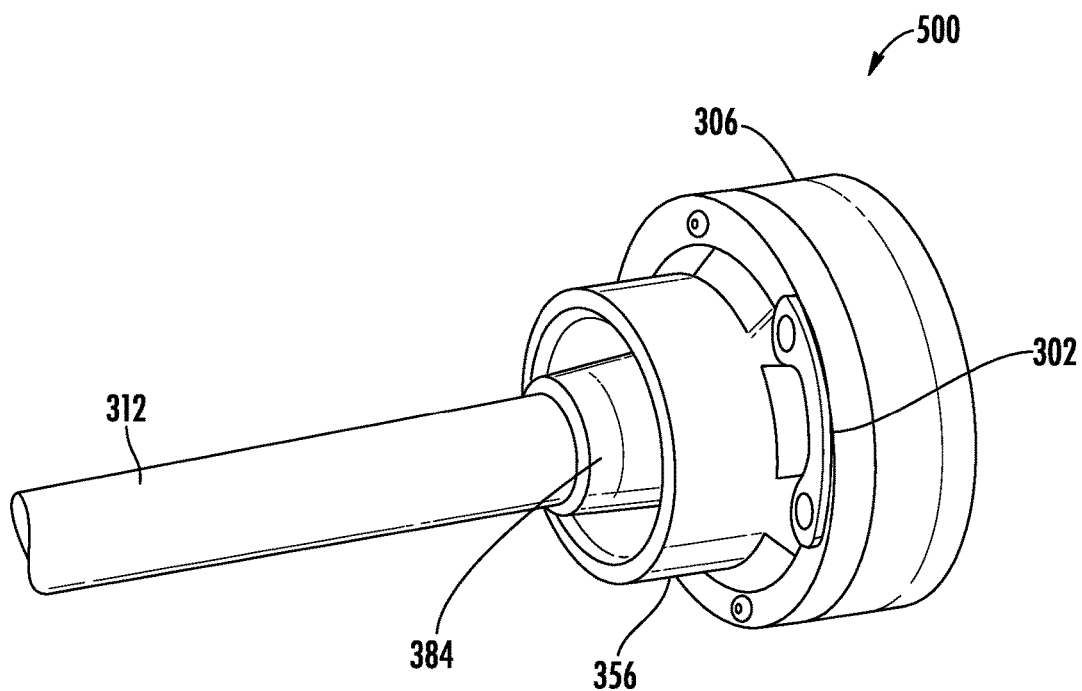
FIG. 10B is a schematic perspective view of the joint assembly illustrated in FIG. 10A having one or more balancing elements according to an embodiment of the disclosure.

FIGS. 10A-10C provide a schematic illustration of a joint assembly 500 having one or more balancing elements 302, 420, 430, 440, 450, 460 and/or 470 according to an embodiment of the disclosure. The joint assembly 500 illustrated in FIGS. 10A-10C is the same as the joint assembly 300 illustrated in FIGS. 3A-3E, except where specifically noted below. As illustrated in FIGS. 10A-10C of the disclosure and as a non-limiting example, the joint assembly 500 does not include the second shaft 340 illustrated in FIGS. 3A-3B.

In accordance with the embodiment of the disclosure illustrated in FIGS. 10A-10C and as a non-limiting example, the joint assembly 500 includes a second shaft 502 having a first end portion 504, a second end portion (not shown) and an intermediate portion 506 interposed between the first end portion 504 and the second end portion (not shown). As best seen in FIG. 10C and as a non-limiting example, at least a portion of the first end portion 504 of the second shaft 502 may be drivingly connected to at least a portion of the second end portion 330 of the second joint member 306 of the joint assembly 500. It is within the scope of this disclosure and as a non-limiting example that the second shaft 502 may be connected to the second joint member 306 by using one or more welds, one or more mechanical fasteners, one or more adhesives, a spline connection and/or a threaded connection. Additionally, it is within the scope of this disclosure and as a non-limiting example that the second shaft 502 may be a stub shaft, an intermediate shaft, a drive sleeve, a prop shaft, a propeller shaft, a drive shaft, a pinion shaft, an axle half shaft, an input shaft or an output shaft. As a result, it is therefore to be understood that the second shaft 502 may be a driving shaft that provides an amount of rotational energy to the joint assembly 500 or a driven shaft that transmits the rotational energy from the joint assembly 500 to an adjacent drive-train component (not shown).

According to the embodiment of the disclosure illustrated in FIGS. 10A-10C and as a non-limiting example, the intermediate portion 506 of the second shaft 502 has a diameter D1 and the second joint member 306 has a diameter D2. It is within the scope of this disclosure and as a non-limiting example that the diameter D1 of the second shaft 502 may be substantially equal to or less than the diameter D2 of the second joint member 306. Additionally, it is within the scope of this disclosure and as a non-limiting example that the second shaft 502 may be substantially solid or solid.

The one or more balancing elements 302, 420, 430, 440, 450, 460 and/or 470 of the joint assembly 500 may be used to cancel out, reduce, minimize and/or eliminate the imbalance(s) identified within the first shaft 312 and/or the second shaft 502.

Figure 11:
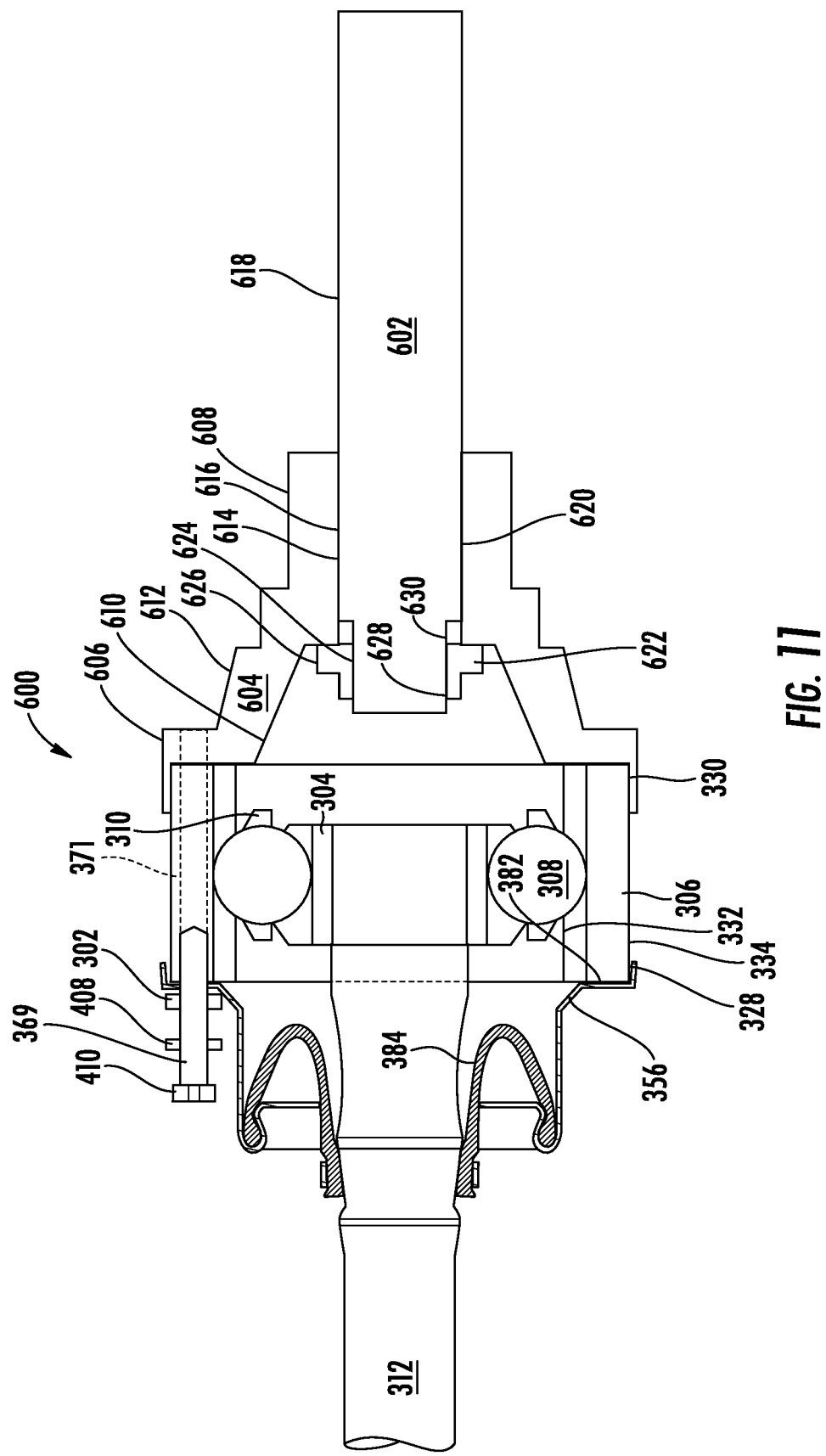
FIG. 11 is a partial cut-away schematic side-view of yet another joint assembly having one or more balancing elements according to an embodiment illustrated in FIGS. 3A-10C of the disclosure.

FIG. 11 is a partial cut-away schematic side-view of a joint assembly 600 having one or more balancing elements 302, 420, 430, 440, 450, 460 and/or 470 according to an embodiment of the disclosure. The joint assembly 600 illustrated in FIG. 11 is the same as the joint assemblies 300 and 500 illustrated in FIGS. 3A, 3B and 10A-10C, except where specifically noted below. As illustrated in FIG. 11 of the disclosure and as a non-limiting example, the joint assembly 600 does not include the second shaft 340 and 502 illustrated in FIGS. 3A, 3B and 10A-10C.

In accordance with the embodiment of the disclosure illustrated in FIG. 11 of the disclosure and as a non-limiting example, the joint assembly 600 may include a second shaft 602 that is drivingly connected to at least a portion of the second end portion 330 of the second joint member 306 of the joint assembly 600 by using a companion flange 604. It is within the scope of this disclosure and as a non-limiting example that the second shaft 602 may be a stub shaft, an intermediate shaft, a drive sleeve, a prop shaft, a propeller shaft, a drive shaft, a pinion shaft, an axle half shaft, an input shaft or an output shaft.

As illustrated in FIG. 11 of the disclosure and as a non-limiting example, the companion flange 604 has a first end portion 606, a second end portion 608, an inner surface 610 and an outer surface 612. At least a portion of the first end portion 606 of the companion flange 604 may be drivingly connected to at least a portion of the second end portion 330 of the second joint member 306. It is within the scope of this disclosure and as a non-limiting example that the first end portion 606 of the companion flange 604 may be connected to the second end portion 330 of the second joint member 306 by using one or more welds, one or more mechanical fasteners, one or more adhesives, a spline connection and/or a threaded connection.

At least a portion of the second end portion 608 of the companion flange 604 may be drivingly connected to at least a portion of the second shaft 602. A plurality of axially extending companion flange splines 614 may circumferentially extend along at least a portion of the inner surface 610 of the second end portion 608 of the companion flange 604 of the joint assembly 600. The plurality of axially extending companion flange splined 614 are complementary to and meshingly engaged with a plurality of axially extending second shaft splines 616 circumferentially extending along at least a portion of an outer surface 618 of a first end portion 620 of the second shaft 602 of the joint assembly 600.

In order to axially restrain the second shaft 602 to the companion flange 604, a nut 622 may be used. As illustrated in FIG. 11 of the disclosure and as a non-limiting example, the nut 622 has an inner surface 624 and an outer surface 626. A plurality of nut threads 628 may circumferentially extend along at least a portion of the inner surface 624 of the nut 622. The plurality of nut threads 628 are complementary to and meshingly engaged with a plurality of second shaft threads 630 circumferentially extending along at least a portion of the outer surface 681 of the first end portion 620 of the second shaft 602. According to the embodiment illustrated in FIG. 11 of the disclosure and as a non-limiting example, the plurality of axially extending second shaft splines 616 are disposed axially inboard from and directly adjacent to the plurality of second shaft threads 630 on the outer surface 618 of the second shaft 602.

Figure 12A:
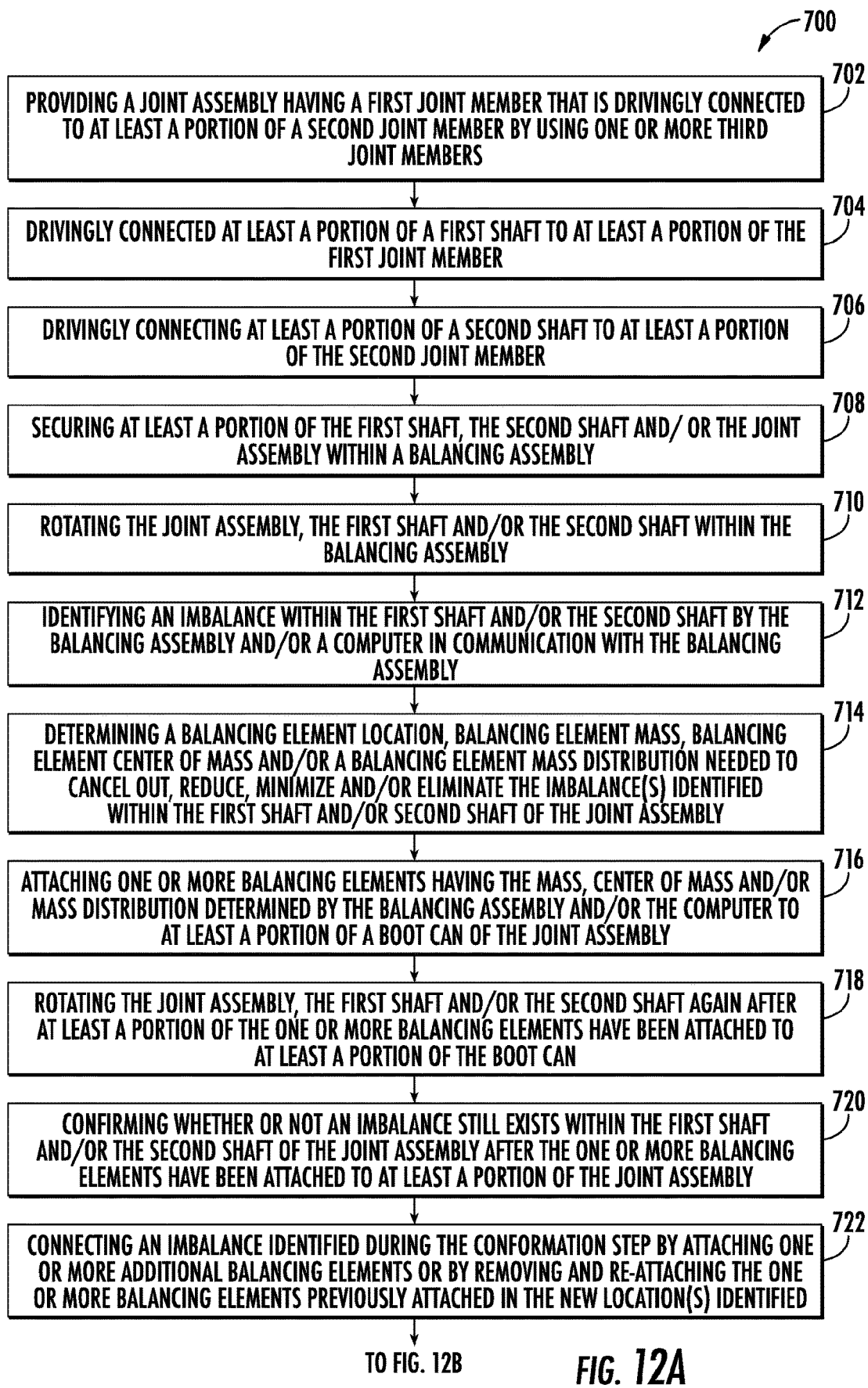
FIG. 12A is a flow-chart illustrating a portion of a method of correcting an imbalance in a rotating shaft using one or more balancing elements according to an embodiment of the disclosure.

FIGS. 12A and 12B provide a flow-chart illustrating a method of correcting an imbalance in a rotating shaft 700 using one or more balancing elements 302, 420, 430, 440, 450, 460 and/or 470 according to an embodiment of the disclosure. As illustrated in FIG. 12A of the disclosure and as a non-limiting example, the method of correcting an imbalance in a rotating shaft 700 includes the step of providing 702 a joint assembly 300, 500 or 600 having a first joint member 304 that is drivingly connected to a second joint member 306 via one or more third joint members 308. At least a portion of a boot can 356 may be connected to at least a portion of a first end portion 328 of the second joint member 306. At least a portion of a first shaft 312 may be drivingly connected 704 to the first joint member 304 and at least a portion of a second shaft 340, 502 or 602 may be drivingly connected 706 to at least a portion of a second end portion 330 of the second joint member 306.

The joint assembly 300, 500 or 600, the first shaft 312 and/or the second shaft 340, 503 or 602 may be secured 708 within a balancing assembly (not shown). Once secured 708 within the balancing assembly (not shown), the joint assembly 300, 500 or 600, the first shaft 312 and/or the second shaft 340, 503 or 602 may be rotated 710 in order to identify an imbalance within the first shaft 312 and/or the second shaft 340, 502 or 602 of the joint assembly 300, 500 or 600. The balancing assembly (not shown) and/or a computer (not shown) in communication with the balancing assembly (not shown) may then identify the presence of an imbalance 712 within the first shaft 312 and/or the second shaft 340, 503 or 602 of the joint assembly 300, 500 or 600.

After the imbalance has been identified 712, the balancing apparatus (not shown) and/or the computer (not shown) in communication with the balancing apparatus (not shown) may be used in order to determine 714 a balancing element location, balancing element mass, balancing element center of mass and/or a balancing element mass distribution that is needed in order to cancel out, reduce, minimize and/or eliminate the imbalance(s) identified within the first shaft 312 and/or second shaft 340, 502 or 602.

Once the balancing element location, balancing element mass, balancing element center of mass and/or a balancing element mass distribution has been determined 714, one or more balancing elements 302, 420, 430, 440, 450, 460 and/or 470 having the pre-determined mass, center of mass and/or mass distribution may then be attached 716 to at least a portion of the boot can in the location(s) determined 714 by the balancing assembly (not shown) and/or the computer (not shown).

After the one or more balancing elements 302, 420, 430, 440, 450, 460 and/or 470 have been attached to the boot can 356, the balancing assembly (not shown) may then rotate 718 the joint assembly 300, 500 or 600, the first shaft 312 and/or the second shaft 340, 502 or 602 again. As the balancing assembly (not shown) rotates the joint assembly 300, 500 or 600, the first shaft 312 and/or the second shaft 340, 502 or 602, the balancing assembly (not shown) and/or the computer (not shown) may be used in order to confirm 720 whether or not an imbalance still exists within the first shaft 312 and/or the second shaft 340, 502 or 602. If an imbalance is identified to still exist within the first shaft 312 and/or the second shaft 340, 502 or 602, the balancing assembly (not shown) and/or a computer (not shown) may then determine a balancing element location, balancing element mass, balancing element center of mass and/or a balancing element mass distribution needed to cancel out, reduce, minimize and/or eliminate the imbalance(s) identified within the first shaft 312 and/or second shaft 340, 502 or 602. The imbalance identified during the conformation step 720 may then be corrected 722 using the one or more balancing elements 302, 420, 430, 440, 450, 460 and/or 470 described and illustrated herein. It is within the scope of this disclosure and as a non-limiting example that the imbalance identified may be corrected 722 by attaching one or more additional balancing elements 302, 420, 430, 440 and/or 450 having the pre-determined mass, center or mass and/or mass distribution to at least a portion of the boot can 356 in the new location(s) identified or by removing and re-attaching the one or more balancing elements 302, 420, 430, 440, 450, 460 and/or 470 previously attached to the boot can 367 in the new location(s) identified.

As illustrated in FIG. 12B and as a non-limiting example, the method of correcting an imbalance in a rotating shaft 700 may include the step of forming 724 the one or more balancing elements 302, 420, 430, 440, 450, 460 and/or 470 having the mass, center or mass and/or mass distribution needed to correct the one or more imbalances identified within the first shaft 312 and/or second shaft 340, 502 or 602. The step of forming 724 the one or more balancing elements 302, 420, 430, 440, 450, 460 and/or 470 may include the step of providing 726 the one or more balancing elements 302, 420, 430, 440, 450, 460 and/or 470 with one or more second balancing element apertures 432 in order to achieve the desired mass, center or mass and/or mass distribution needed to correct the one or more imbalances identified. Additionally, the step of forming 724 the one or more balancing elements 302, 420, 430, 440, 450, 460 and/or 470 may include the step of providing 728 the one or more balancing elements 302, 420, 430, 440, 450, 460 and/or 470 with the one or more additional mass portions 422 and/or 462 needed in order to achieve the desired mass, center or mass and/or mass distribution to correct the one or more imbalances identified. Furthermore, the step of forming 724 the one or more balancing elements 302, 420, 430, 440, 450, 460 and/or 470 may include the step of providing 730 the one or more balancing elements 302, 420, 430, 440, 450, 460 and/or 470 with the one or more radially protruding portions 442 and/or 472 needed in order to achieve the desired mass, center or mass and/or mass distribution to correct the one or more imbalances identified.

The method of correcting an imbalance in a rotating shaft 700 may include the step of applying 732 an amount of one or more adhesives or epoxies 407 to at least a portion of the one or more balancing elements 302, 420, 430, 440, 450, 460 and/or 470 in order to permanently or temporarily attach the one or more balancing elements 302, 420, 430, 440, 450,

460 and/or 470 to at least a portion of the boot can 356. It is to be understood that the one or more adhesives or epoxies 407 may have a shear strength that is sufficient to withstand the centrifugal and dynamic forces acting upon the one or more balancing elements 302, 420, 430, 440, 450, 460 and/or 470 during the balancing operation(s) performed. As a non-limiting example, the one or more adhesives or epoxies 407 may be applied 732 directly to the body portion 390 either before or after the final shape of the one or more balancing elements 302, 420, 430, 440, 450, 460 and/or 470 has been formed 724. Additionally, as a non-limiting example, the one or more adhesives or epoxies 407 may be applied to the body portion 390 of the one or more balancing elements 302, 420, 430, 440, 450, 460 and/or 470 in the form of a double-sided tape, or by using a brush or a roller to apply the one or more adhesives or epoxies 407.

According to the embodiment where the one or more adhesives or epoxies 407 applied 732 to the body portion 390 of the one or more balancing elements 302, 420, 430, 440, 450, 460 and/or 470 in the form of a double-sided tape, the method may further include the step of removing 734 one or more liners (not shown) from the double-sided tape thereby exposing the one or more adhesives or epoxies 407 on the double-sided tape. Once the liner covering the one or more adhesives or epoxies 407 have been removed, at least a portion of the one or more balancing elements 302, 420, 430, 440, 450, 460 and/or 470 may be adhered either permanently or temporarily to the outer surface 368 of the boot can 356.

In accordance with the embodiment where one or more adhesives or epoxies 407 are applied 732 to the one or more balancing elements 302, 420, 430, 440, 450, 460 and/or 470, the application step 732 may include the step of providing 736 one or more grooves 452 in the body portion 390 of the one or more balancing elements 302, 420, 430, 440, 450, 460 and/or 470. Additionally, according to the embodiment where one or more adhesives or epoxies 407 are applied 732 to the one or more balancing elements 302, 420, 430, 440, 450, 460 and/or 470, the application step 732 may further include the step of providing 738 one or more second balancing element apertures 432 in the body portion 390 of the one or more balancing elements 302, 420, 430, 440, 450, 460 and/or 470 that are in fluid communication with the one or more grooves 452 in the body portion 390 of the one or more balancing elements 302, 420, 430, 440, 450, 460 and/or 470.

It is therefore to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A joint assembly, comprising:
   a first joint member drivingly connected to a second joint member by one or more third joint members;
   a first shaft drivingly connected to at least a portion of said first joint member;
   a second shaft drivingly connected to at least a portion of a second end portion of said second joint member;
   a boot can connected to at least a portion of a first end portion of said second joint member; and
   one or more balancing elements connected to at least a portion of said boot can;
   wherein at least a portion of said second end portion of said boot can has a radially outboard extending portion; and
   wherein at least a portion of said one or more balancing elements are attached to at least a portion of said radially outboard extending portion of said boot can.

2. The joint assembly of claim 1, wherein said joint assembly is a constant velocity joint assembly, a homokinetic joint, a CV joint, a plunging constant velocity joint, a direct pinion mount constant velocity joint, a plunging cross-groove sliding ball type constant velocity joint, a tripod type constant velocity joint or a fixed non-plunging type constant velocity joint.

3. The joint assembly according to claim 1, wherein said second shaft is drivingly connected to said second end portion of said second joint member by a companion flange;
   wherein said companion flange has a first end portion, a second end portion, an inner surface and an outer surface;
   wherein at least a portion of said first end portion of said companion flange is drivingly connected to at least a portion of said second end portion of said second joint member; and
   wherein at least a portion of said second end portion of said companion flange is drivingly connected to at least a portion of a first end portion of said second shaft.

4. The joint assembly according to claim 1, further comprising a flexible boot having a first end portion and a second end portion;
   wherein at least a portion of said first end portion of said flexible boot is sealingly engaged with at least a portion of an outer surface of said first shaft;
   wherein at least a portion of a second end portion of said flexible boot is sealingly engaged with at least a portion of a first end portion of said boot can; and
   wherein at least a portion of a second end portion of said boot can is connected to at least a portion of said first end portion of said second joint member.

5. The joint assembly according to claim 1, wherein one or more boot can apertures extend from an inner surface to an outer surface of said radially outboard extending portion of said boot can;
   wherein said one or more boot can apertures are complementary to one or more second joint member apertures extending inboard from at least a portion of a first side of said second joint member;
   wherein one or more first balancing element apertures extend from a first side to a second side of a body portion of said one or more balancing elements;
   wherein said one or more first balancing element apertures are complementary to said one or more boot can apertures in said boot can and said one or more second joint member apertures in said second joint member; and
   wherein said one or more first balancing element apertures, said one or more boot can apertures and/or said one or more second joint member apertures have a size and shape to receive and/or retain at least a portion of one or more mechanical fasteners.

6. The joint assembly according to claim 5, wherein said body portion of said one or more balancing elements have a thickness T1 that is substantially constant or variable from a first end portion to a second end portion of said body portion.

7. The joint assembly according to claim 5, wherein said body portion of said one or more balancing elements have a height that is substantially constant from said first end portion to said second end portion of said body portion.

8. The joint assembly according to claim 5, wherein an intermediate portion of said body portion of said one or more balancing elements has a height H3 that is less than a height H1 and H2 of said first end portion and said second end portion of said body portion of said one or more balancing elements.

9. The joint assembly according to claim 5, wherein one or more adhesives or epoxies are applied to at least a portion of a first side and/or a second side of said body portion of said one or more balancing elements; and
wherein said one or more adhesives or epoxies adhere at least a portion of said one or more balancing elements to at least a portion of said outer surface of said radially outboard extending portion of said boot can.

10. The joint assembly according to claim 5, wherein said one or more adhesives or epoxies are applied to said second side of said body portion of said one or more balancing elements as a double-sided tape.

11. The joint assembly according to claim 5, wherein one or more grooves extend along at least a portion of said first side and/or said second side of said body portion of said one or more balancing elements; and
wherein said one or more grooves have a size and shape to receive and/or retain at least a portion of said one or more adhesives or epoxies applied to said body portion of said one or more balancing elements.

12. The joint assembly according to claim 5, wherein said body portion of said one or more balancing elements has a radially outboard surface with a shape defined by a radius R1 from a theoretical center TC of said one or more balancing elements.

13. The joint assembly according to claim 5, wherein said body portion of said one or more balancing elements has a radially inboard surface with a shape defined by a radius R2 from a theoretical center TC of said one or more balancing elements.

14. The joint assembly according to claim 5, wherein said body portion of said one or more balancing elements further comprises one or more radially protruding portions extending outboard from at least a portion of said radially outboard surface and/or said radially inboard surface of said body portion; and
wherein said one or more radially protruding portions are integrally formed as part of said body portion of said one or more balancing elements or integrally connected to at least a portion of said body portion of the one or more balancing elements.

15. The joint assembly according to claim 5, wherein at least a portion of said one or more radially protruding portions extend at an angle from said body portion of said one or more balancing elements.

16. The joint assembly according to claim 5, wherein said body portion of said one or more balancing elements further comprises one or more additional mass portions extending from at least a portion of said first side and/or said second side of said body portion; and
wherein at least a portion of said one or more additional mass portions are integrally formed as part of said body portion of said one or more balancing elements or integrally connected to at least a portion of said body portion of said one or more balancing elements.

17. The joint assembly according to claim 5, wherein said one or more balancing elements further comprise one or more second balancing element apertures extending from said first side to said second side of said body portion of said one or more balancing elements; and
wherein said one or more second balancing element apertures selectively alter a balancing element mass, a balancing element center of mass and/or a balancing element mass distribution of said one or more balancing elements.

18. The joint assembly according to claim 1, further comprising:
one or more washers having a pre-determined mass;
wherein said one or more washers are interposed between and are in direct contact with at least a portion of a head of said one or more mechanical fasteners and/or said one or more balancing elements; and
wherein said one or more washers aid in canceling out, reducing, minimizing and/or eliminating an imbalance within said first shaft and/or said second shaft.

19. A method of balancing a shaft, comprising:
providing a joint assembly having a first joint member drivingly connected to a second joint member by one or more third joint members, wherein a first shaft is drivingly connected to at least a portion of said first joint member, wherein at least a portion of a second shaft is drivingly connected to at least a portion of a second end portion of said second joint member, and wherein at least a portion of a boot can having a radially outboard extending portion is attached to at least a portion of a first end portion of said second joint member;
securing at least a portion of said joint assembly within a balancing assembly;
rotating said joint assembly within said balancing assembly;
identifying an imbalance within said first shaft and/or said second shaft;
determining one or more balancing element locations, one or more balancing element masses, one or more balancing element center of masses and/or one or more balancing element mass distributions needed to cancel out, minimize and/or eliminate said imbalance identified within said first shaft and/or second shaft; and
attaching at least a portion of one or more balancing elements having said one or more balancing element masses, said one or more balancing element center of masses and/or said one or more balancing element mass distributions determined to at least a portion of said radially outboard extending portion of said boot can in said one or more balancing element locations determined.

* * * * *